(12) United States Patent
Koyama et al.

(10) Patent No.: US 11,977,151 B2
(45) Date of Patent: May 7, 2024

(54) OBJECT DETECTING DEVICE, OBJECT DETECTING METHOD, AND OBJECT DETECTING PROGRAM

(71) Applicant: DENSO CORPORATION, Kariya (JP)

(72) Inventors: Yu Koyama, Nisshin (JP); Tetsuya Aoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 145 days.

(21) Appl. No.: 17/807,492

(22) Filed: Jun. 17, 2022

(65) Prior Publication Data

US 2022/0317291 A1 Oct. 6, 2022

Related U.S. Application Data

(63) Continuation of application No. PCT/JP2020/042453, filed on Nov. 13, 2020.

(30) Foreign Application Priority Data

Dec. 20, 2019 (JP) .................................. 2019-230484

(51) Int. Cl.
*G01S 15/10* (2006.01)
*G01S 7/52* (2006.01)
*G01S 7/524* (2006.01)

(52) U.S. Cl.
CPC ........ *G01S 15/104* (2013.01); *G01S 7/52004* (2013.01); *G01S 7/524* (2013.01)

(58) Field of Classification Search
CPC ........ G01S 15/931; G01S 7/526; G01S 7/524; G01S 15/104; G01S 7/52004;

(Continued)

(56) References Cited

U.S. PATENT DOCUMENTS 9,632,177 B2 * 4/2017 Inagaki ................. G01S 15/876
10,444,350 B2 * 10/2019 Hustava ................ G01S 15/104
(Continued)

FOREIGN PATENT DOCUMENTS

JP 09297172 A * 11/1997
JP 4267161 B2 5/2009
(Continued)

*Primary Examiner* — Daniel L Murphy
*Assistant Examiner* — Amie M Ndure
(74) *Attorney, Agent, or Firm* — MASCHOFF BRENNAN

(57) ABSTRACT

An object detection apparatus detects an object in a vicinity of a moving body in a state of being mounted to the moving body. The object detection apparatus measures a reverberation frequency that is a frequency of a reverberation signal that is generated in a transceiver that externally transmits a transmission wave that is an ultrasonic wave and receives a reception wave that includes a reflected wave of the transmission wave from the object. object detection apparatus detects the object based on the reception wave. The object detection apparatus sets at least one of a transmission characteristic and a reception characteristic in the transceiver. The object detection apparatus sets at least one of transmission characteristics of the transmission wave and/or sets circuit characteristics in the transceiver. The object detection apparatus reduces at least one of the transmission characteristic and the reception characteristic during measurement of the reverberation frequency.

19 Claims, 8 Drawing Sheets

(58) Field of Classification Search
CPC ........... G01S 2007/52009; G01S 15/32; G01S 2015/937; G01S 2007/52007; G01S 15/93; H04R 3/00; G01N 2291/014
See application file for complete search history.

(56) References Cited

U.S. PATENT DOCUMENTS

| | | | |
|---|---|---|---|
| 10,901,083 B2 * | 1/2021 | Shiba | G01S 15/32 |
| 11,500,081 B2 * | 11/2022 | Sugae | G01S 15/04 |
| 11,555,922 B2 * | 1/2023 | Suzuki | G01S 7/52004 |
| 2002/0023498 A1 * | 2/2002 | Tsuzuki | G01N 29/38 |
| | | | 73/609 |
| 2014/0355385 A1 * | 12/2014 | Inagaki | G01S 15/931 |
| | | | 367/99 |
| 2016/0209509 A1 * | 7/2016 | Naruse | G01S 7/52004 |
| 2018/0003808 A1 | 1/2018 | Niwa | |
| 2018/0031701 A1 * | 2/2018 | Hustava | G01S 7/52004 |
| 2019/0033445 A1 * | 1/2019 | Shiba | G01S 15/104 |
| 2019/0317202 A1 * | 10/2019 | Matsuura | G01S 15/931 |
| 2019/0377074 A1 * | 12/2019 | Sugae | G01S 15/42 |
| 2020/0049818 A1 * | 2/2020 | Aoyama | G01S 7/526 |
| 2020/0225346 A1 * | 7/2020 | Suzuki | G01S 7/526 |
| 2021/0055397 A1 * | 2/2021 | Matsuura | G01S 15/04 |
| 2021/0302574 A1 * | 9/2021 | Sugae | G01S 7/527 |

FOREIGN PATENT DOCUMENTS

| | | | |
|---|---|---|---|
| JP | 2013250169 A | * | 12/2013 |
| JP | 2018105701 A | * | 7/2018 |
| JP | 2018105702 A | * | 7/2018 |

* cited by examiner

OBJECT DETECTING DEVICE, OBJECT DETECTING METHOD, AND OBJECT DETECTING PROGRAM

CROSS-REFERENCE TO RELATED APPLICATIONS

The present application is a continuation application of International Application No. PCT/JP2020/042453, filed on Nov. 13, 2020, which claims priority to Japanese Patent Application No. 2019-230484, filed on Dec. 20, 2019. The contents of these applications are incorporated herein by reference in their entirety.

BACKGROUND

Technical Field

The present disclosure relates to an object detection apparatus that detects an object in a vicinity of a moving body and an object detection method. The present disclosure also relates to an object detection program that is implemented by the object detection apparatus.

Related Art

An example of an ultrasonic sonar is disclosed. The ultrasonic sonar performs obstacle detection by transmitting an ultrasonic wave from an ultrasonic oscillator and receiving an ultrasonic wave that is reflected by an obstacle through the ultrasonic oscillator. The ultrasonic sonar detects an abnormality based on a reverberation time after transmission of the ultrasonic wave is stopped and a result of frequency analysis.

SUMMARY

One aspect of the present disclosure provides an object detection apparatus that detects an object in a vicinity of a moving body in a state of being mounted to the moving body. The object detection apparatus measures a reverberation frequency that is a frequency of a reverberation signal that is generated in a transceiver that externally transmits a transmission wave that is an ultrasonic wave and receives a reception wave that includes a reflected wave of the transmission wave from the object. object detection apparatus detects the object based on the reception wave. The object detection apparatus sets at least one of a transmission characteristic and a reception characteristic in the transceiver. The object detection apparatus sets at least one of transmission characteristics of the transmission wave and/or sets circuit characteristics in the transceiver. The object detection apparatus reduces at least one of the transmission characteristic and the reception characteristic during measurement of the reverberation frequency.

DESCRIPTION OF THE EMBODIMENTS

Figure 1:
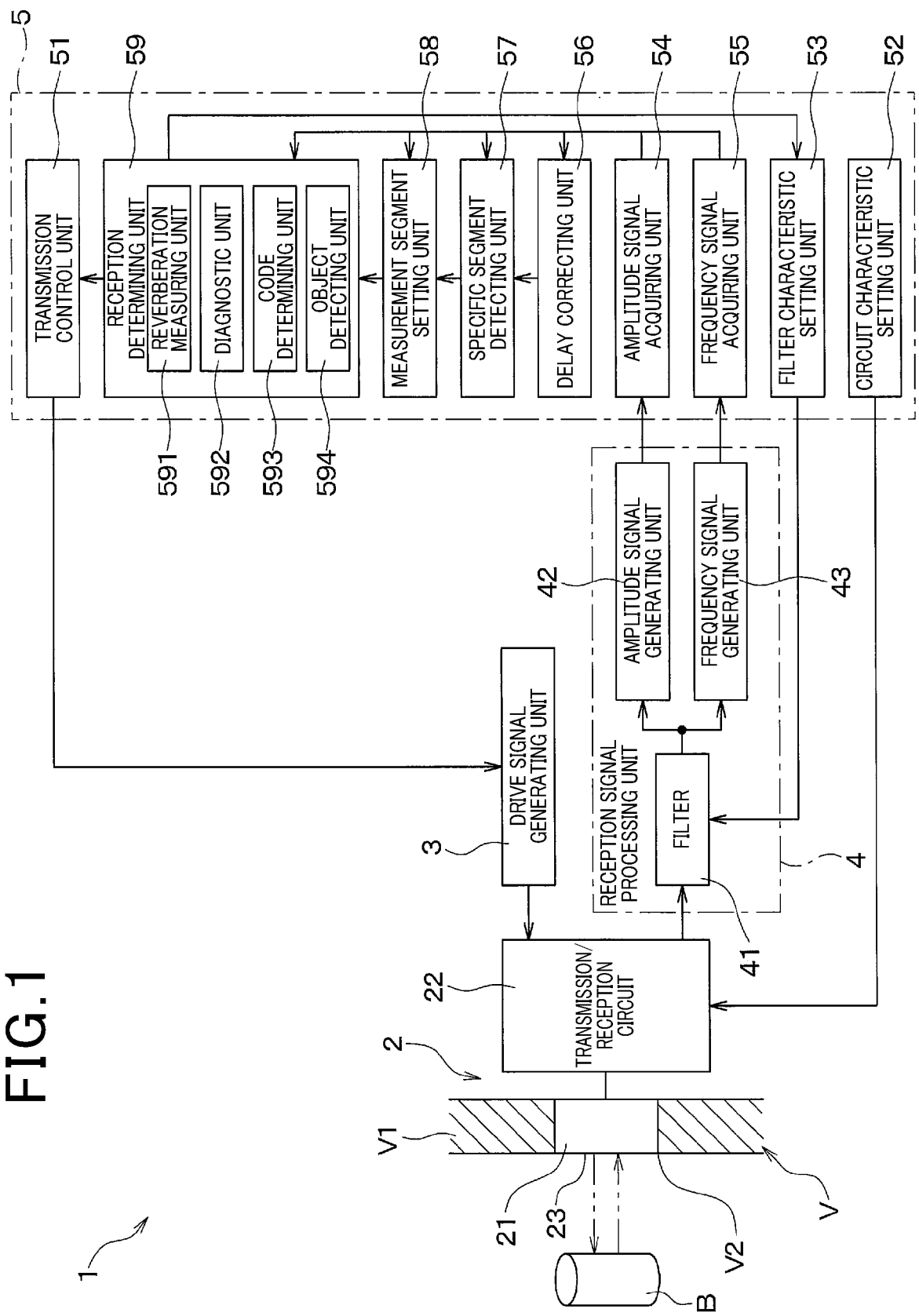
FIG. 1 is a block diagram illustrating an overall configuration of an object detection apparatus according to an embodiment.

Japanese Patent Publication No. 4267161 discloses an example of an ultrasonic sonar. The ultrasonic sonar performs obstacle detection by transmitting an ultrasonic wave from an ultrasonic oscillator and receiving an ultrasonic wave that is reflected by an obstacle through the ultrasonic oscillator. The ultrasonic sonar described in Japanese Patent Publication No. 4267161 detects an abnormality based on a reverberation time after transmission of the ultrasonic wave is stopped and a result of frequency analysis.

Analysis of a reverberation signal, that is, measurement of a reverberation frequency can be used for detection of an abnormality including attachment of foreign matter, such as mud, correction of transmission frequency, and the like. Therefore, analysis of the reverberation signal being performed as accurately as possible is desired. The present disclosure has been achieved in light of circumstances and the like described as examples above. That is, for example, the present disclosure provides an apparatus configuration that enables analysis of a reverberation signal to be performed as accurately as possible, a method, and a program.

An object detection apparatus is configured to detect an object in a vicinity of a moving body in a state of being mounted to the moving body.

A first exemplary embodiment of the present disclosure provides an object detection apparatus that includes: a reverberation measuring unit that measures a reverberation frequency that is a frequency of a reverberation signal that is generated in a transceiver that externally transmits a transmission wave that is an ultrasonic wave and receives a reception wave that includes a reflected wave of the transmission wave from the object; an object detecting unit that detects the object based on the reception wave; and a characteristic setting unit that sets at least one of a transmission characteristic and a reception characteristic in the transceiver. The characteristic setting unit is at least one of a transmission control unit that sets transmission characteristic of the transmission wave and a circuit characteristic setting unit that sets circuit characteristics in the transceiver. The characteristic setting unit reduces at least one of the transmission characteristic and the reception characteristic during measurement of the reverberation frequency by the reverberation measuring unit from that during detection of the object by the object detecting unit.

A second exemplary embodiment of the present disclosure provides an object detection method that is an object detection method for detecting an object in a vicinity of a moving body, the object detection method including following processes or steps for: setting at least one of transmission characteristic and reception characteristic in a transceiver that externally transmits a transmission wave that is an ultrasonic wave and receives a reception wave that includes a reflected wave of the transmission wave from the object; measuring a reverberation frequency that is a frequency of a reverberation signal that is generated in the transceiver; detecting an object based on the reception wave; and in setting at least one of the transmission characteristic and the reception characteristic, reducing at least one of the transmission characteristic and the reception characteristic during measurement of the reverberation frequency from that during detection of the object.

A third exemplary embodiment of the present disclosure provides a non-transitory computer-readable storage medium storing therein an object detection program for causing an object detection apparatus, which detects an object in a vicinity of a moving body in a state of being mounted to a moving body, to implement processes including: a process for setting at least one of a transmission characteristic and a reception characteristic in a transceiver that externally transmits a transmission wave that is an ultrasonic wave and receives a reception wave that includes a reflected wave of the transmission wave from an object; a process for measuring a reverberation frequency that is a frequency of a reverberation signal that is generated in the transceiver; and a process for detecting an object based on the reception. In the process for setting at least one of the transmission characteristic and the reception characteristic, at least one of the transmission characteristic and the reception characteristic are reduced during measurement of the reverberation frequency from that during detection of the object.

Here, reference numbers in parentheses may be attached to elements in each section of the application documents. However, the reference numbers merely denote examples of corresponding relationships between the elements and specific means described according to the embodiments described hereafter. Therefore, the present disclosure is not limited in any way by the reference numbers described above.

Embodiments

Embodiments of the present disclosure will hereinafter be described with reference to the drawings. Here, regarding various modifications that are applicable to an embodiment, understanding of the embodiment may be hindered if the modifications are inserted in the middle of a series of descriptions related to the embodiment. Therefore, the modifications are collectively described following the description of the embodiment.

(Configuration)

With reference to FIG. 1, an object detection apparatus 1 is configured to detect an object B in a vicinity, that is, outside of a vehicle V in a state of being mounted to the vehicle V. The vehicle V serves as a moving body. A state in which the object detection apparatus 1 is mounted to the vehicle V is referred to, hereafter, as an onboard state. In addition, the vehicle V in which the object detection apparatus 1 according to the present embodiment is mounted is referred to, hereafter, as an own vehicle.

The object detection apparatus 1 has a configuration as a so-called ultrasonic sensor. Specifically, the object detection apparatus 1 is configured to detect the object B that is in the vicinity and acquire distance measurement information that corresponds to the object B by transmitting and receiving ultrasonic waves. The object detection apparatus 1 is connected to an external apparatus such as to be capable of communicating information over an onboard network line. For example, the external apparatus may be an obstacle detection ECU (not shown) that controls an object detection operation and various operations accompanying the object detection operation, such as notification, in the own vehicle. ECU is an abbreviation of Electronic Control Unit.

The object detection apparatus 1 includes a transceiver 2, a drive signal generating unit 3, a reception signal processing unit 4, and a control unit 5. The object detection apparatus 1 has a configuration in which the transceiver 2, the drive signal generating unit 3, the reception signal processing unit 4, and the control unit 5 are supported while being housed in a single sensor casing.

The transceiver 2 is configured to externally transmit a transmission wave that is an ultrasonic wave and receive a reflected wave of the transmission wave from the object B. According to the present embodiment, the object detection apparatus 1 has an integrated transmission/reception-type configuration. That is, the object detection apparatus 1 is configured to provide transmission and reception functions in the transceiver 2 by including the single transceiver 2.

The transceiver 2 includes a transducer 21 and a transmission/reception circuit 22. The transducer 21 that provides an electromechanical conversion function is configured as an ultrasonic microphone in which an electromechanical energy conversion element is provided inside a microphone casing that has a substantially circular cylindrical shape. The transducer 21 outputs a transmission wave that is an ultrasonic wave based on an inputted electrical signal and conversely outputs an electrical signal based on an inputted reception wave that is an ultrasonic wave. According to the present embodiment, the transducer 21 includes a piezoelectric element as the electromechanical energy conversion element. In an onboard state, the transducer 21 is arranged in a position that faces externally from the own vehicle. As a result, the transducer 21 is provided such as to be capable of transmitting the transmission wave outside the own vehicle and receiving the reflected wave from outside the own vehicle.

Specifically, in the onboard state, the transducer 21 is mounted in an outer plate member V1 such that a transmission/reception surface 23 is exposed to a space outside the own vehicle from a mounting hole V2 that is a through-hole that is formed in the outer plate member V1 of the own vehicle. For example, the outer plate member V1 may be a bumper or a body panel, and is formed by a plate material that is made of a synthetic resin or metal. The transmission/reception surface 23 is an outer surface of the above-described microphone casing of the transducer 21, and is provided to function as a transmission surface for the transmission wave and a reception surface for the reception wave. Here, functions and configurations of the transducer 21 are already publicly known or well known at the time of filing of the present application. Therefore, descriptions of further details of the functions and configurations of the transducer 21 are omitted in the present specification.

The transceiver 2 includes one of each of the transducer 21 and the transmission/reception circuit 22. The transducer 21 is electrically connected to the transmission/reception circuit 22. The transmission/reception circuit 22 has a digital/analog conversion circuit, an amplifier circuit, an analog/digital conversion circuit, and the like.

The transmission/reception circuit 22 is configured to drive the transducer 21 based on an inputted drive signal and thereby make the transducer 21 transmit a transmission wave at a frequency that corresponds to a frequency of the drive signal. The drive signal is a signal for driving the transceiver 2 and making the transducer 21 transit the transmission wave. For example, the drive signal may be a pulse-like signal that has frequencies that are within an ultrasonic band. The frequency of the drive signal is referred to, hereafter, as a drive frequency.

In addition, the transmission/reception circuit 22 is configured to generate a reception signal by performing an analog/digital conversion process and the like on an element output signal and output the reception signal to the reception signal processing unit 4. The element output signal is an alternating-current voltage signal that is generated and outputted by the transducer 21 as a result of oscillation of the transmission/reception surface 23 when the transmission/reception surface 23 is excited by reception of a reception wave and the like. The reception signal includes not only reception of the reception wave, but also that which is generated as a result of reverberation that is generated in the transceiver 2 after the drive signal is interrupted. The reception signal that is generated as a result of reverberation is referred to, hereafter, as a reverberation signal. Here, functions and configurations of the transmission/reception circuit 22 are already publicly known or well known at the time of filing of the present application. Therefore, descriptions of further details of the functions and configurations of the transmission/reception circuit 22 are omitted in the present specification.

The drive signal generating unit 3 is provided to generate the drive signal and output the drive signal towards the transceiver 2, that is, the transmission/reception circuit 22 based on a control signal that is received from the control unit 5. The control signal is a signal for controlling output of the drive signal from the drive signal generating unit 3 to the transceiver 2.

The drive signal generating unit 3 is provided to generate and output a drive signal that corresponds to a waveform pattern of a transmission wave that is encoded based on the waveform pattern. Specifically, the drive signal generating unit 3 is configured to selectively generate and output a chirp drive signal in which the transmission wave is a chirp wave and a CW drive signal in which the transmission wave is a CW wave. A chirp wave is a wave of which the frequency increases or decreases with the elapse of time. A CW wave is a wave of which the frequency is fixed. CW is an abbreviation of continuous waveform. The CW wave is also referred to as a CF wave. CF is an abbreviation of continuous frequency. The chirp wave is a type of FM wave. FM is an abbreviation of frequency modulation.

The reception signal processing unit 4 is configured to generate an amplitude signal and a frequency signal by performing various types of signal processing on the reception signal. The amplitude signal is a signal that corresponds to an amplitude of the reception signal. The frequency signal is a signal that corresponds to a frequency of the reception signal. That is, the frequency signal is a signal that corresponds to a waveform pattern that is related to encoding in the reception signal. Specifically, the reception signal processing unit 4 includes a filter processing unit 41, an amplitude signal generating unit 42, and a frequency signal generating unit 43.

The filter processing unit 41 is provided to perform a filter process to remove noise from the reception signal. The amplitude signal generating unit 42 is provided to generate and output the amplitude signal based on the reception signal after the filter process by the filter processing unit 41. The frequency signal generating unit 43 is provided to generate and output the frequency signal based on the reception signal after the filter process by the filter processing unit 41.

Here, functions and configurations of the filter processing unit 41, the amplitude signal generating unit 42, and the frequency signal generating unit 43 are already publicly known or well known at the time of filing of the present application. Therefore, descriptions of further details of the functions and configurations of the filter processing unit 41, the amplitude signal generating unit 42, and the frequency signal generating unit 43 are omitted in the present specification.

The control unit 5 is provided to control overall operations of the object detection apparatus 1. Specifically, according to the present embodiment, the control unit 5 is a known microcomputer and includes a CPU, a ROM, a non-volatile rewritable memory, a RAM, an input/output interface, and the like. CPU is an abbreviation of Central Processing Unit. ROM is an abbreviation of Read Only Memory. For example, the non-volatile rewritable memory may be an EPROM, EEPROM, a flash memory, a magnetic recording medium, or the like. EPROM is an abbreviation of Erasable Programmable Read Only Memory. EEPROM is an abbreviation of Electrically Erasable Programmable Read Only Memory. RAM is an abbreviation of Random Access Memory. The ROM, the non-volatile rewritable memory, and the RAM are non-transitory computer-readable (tangible) storage media. At least one of the ROM and the non-volatile rewritable memory correspond to a storage medium that stores therein an object detection program according to the present embodiment.

The control unit 5 is configured to perform various processes by reading and implementing a program that is stored in the ROM or the non-volatile rewritable memory. Specifically, the control unit 5 is configured to control transmission of the transmission wave in the transceiver 2 and detect the object B based on a reception wave that is received by the transceiver 2. That is, the control unit 5 has a configuration as an ECU that is provided inside the ultrasonic sensor.

The control unit 5 has following functional elements as functional configurations that are actualized in the microcomputer. That is, the control unit 5 includes a transmission control unit 51, a circuit characteristic setting unit 52, a filter characteristic setting unit 53, an amplitude signal acquiring unit 54, a frequency signal acquiring unit 55, a delay correcting unit 56, a specific segment detecting unit 57, a measurement segment setting unit 58, and a reception determining unit 59.

The transmission control unit 51 is provided to control a transmission state of the transmission wave from the transceiver 2 by outputting a control signal to the drive signal generating unit 3. Specifically, the transmitting control unit 51 sets a drive frequency, a waveform pattern, an output timing, and the like of the drive signal that is generated and outputted by the drive signal generating unit 3, based on the control signal. In addition, the transmission control unit 51 sets a drive current and a drive voltage based on the control signal. The drive current and the drive voltage are a current and a voltage that are applied to the transducer 21.

The transmission control unit 51 that serves as a characteristic setting unit that sets at least one of a transmission characteristic and a reception characteristic of the transceiver 2 is provided to control or set the transmission characteristic of the transmission wave. That is, the transmission control unit 51 is configured to control sound pressure of the transmission wave using transmission output characteristic such as the number of pulses, the drive current, the drive voltage, and a duty ratio. According to the present embodiment, the transmission control unit 51 sets differing transmission output characteristics (such as the numbers of pulses) for main drive and pre-drive. In the main drive, the drive signal is applied (i.e., outputted) to the transceiver 2 during main measurement that is acquisition of distance measurement information for detection of the object B. In the pre-drive, the drive signal is applied (i.e., outputted) to the transceiver 2 during pre-measurement that is measurement of a reverberation frequency preceding the main measurement. The reverberation frequency is a frequency of the reverberation signal. Hereafter, to avoid redundant descriptions in the specification, in the present specification, transmission/reception characteristic is used to mean at least one of a transmission characteristic and a reception characteristic.

The transmission control unit 51 is configured to reduce the transmission characteristic during the pre-drive, compared to that during the main drive. Specifically, during the pre-drive, the transmission control unit 51 decreases the sound pressure of the transmission wave by using a smaller number of pulses than that during the main drive. In addition, the transmission control unit 5 controls transmission of the transmission wave in the transceiver 2 such that, while the transmission wave is frequency-modulated as a chirp wave during the main measurement, that is, the main drive, the transmission wave is not frequency-modulated as a CW wave during the pre-measurement, that is, the pre-drive.

The transmission control unit 51 is provided to correct the drive frequency based on a measurement result of the reverberation frequency of the transceiver 2 by the pre-measurement. At this time, the transmission control unit 51 sets a correction value of the drive frequency that is determined based on the measurement result of the reverberation frequency within a prescribed range.

The circuit characteristic setting unit 52 that serves as a characteristic setting unit that sets the transmission/reception characteristic of the transceiver 2 is provided to set circuit characteristics of the transceiver 2. According to the present embodiment, the circuit characteristic setting unit 52 is configured to set differing circuit characteristics for the pre-measurement that is the measurement of the reverberation frequency by the pre-drive, and the main measurement that is the detection of the object B by the main drive. Specifically, the circuit characteristic setting unit 52 sets a parallel connection state of resistance that is connected in parallel to the transducer 21 in the transmission/reception circuit 22 to differing states between the pre-measurement and the main measurement. In addition, the circuit characteristic setting unit 52 is configured to reduce the reception characteristic during the pre-drive, compared to that during the main drive.

Figure 2:
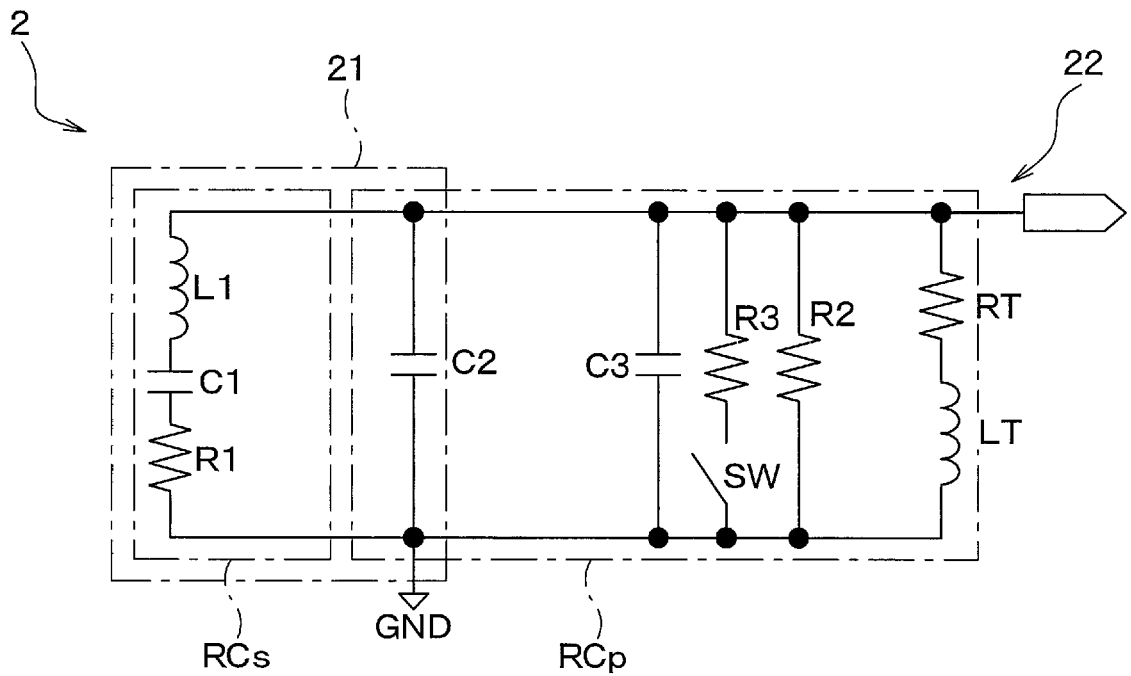
FIG. 2 is a schematic circuit diagram illustrating an equivalent circuit configuration of a portion of a transceiver shown in FIG. 1.

FIG. 2 shows a portion on a secondary side of the transmission/reception circuit 22 that is a connection portion to the transducer 21, together with an equivalent circuit of the transducer 21. In FIG. 2, inductance LT and resistance RT correspond to a secondary-side winding of a transformer that is provided in the transmission/reception circuit 22. Illustration and description of a portion on a primary side of the transmission/reception circuit 22 that includes a primary-side winding of the transformer are omitted.

Capacitance C1, inductance L1, and resistance R1 indicate mechanical vibrations in the transducer 21 as an equivalent circuit. A series resonant circuit RCs is configured by a series connection of the capacitance C1, the inductance L1, and the resistance R1. Capacitance C2 is a capacitance component of the piezoelectric element that is prescribed by an inter-electrode distance, an electrode area, a dielectric constant of a piezoelectric body, and the like of the piezoelectric element. The capacitance C2 is connected in parallel to the series resonant circuit RCs in the equivalent circuit.

A parallel resonant circuit RCp is configured by the secondary-side winding of the transformer that is provided in the transmission/reception circuit 22, the capacitance C2 of the transducer 21, a capacitor C3, and resistance R2. The capacitor 3 is connected in parallel to the transducer 21 for adjustment of temperature characteristic of the transceiver 2 and adjustment of a resonance frequency of the parallel resonant circuit RCp. The resistance R2 is connected in parallel to the transducer 21 and the capacitor C3 to adjust a reverberation time and an amplification factor.

In addition, the parallel resonant circuit RCp is provided with resistance R3 and a switch SW. The resistance R3 functions as an attenuator that decreases the amplification factor and is provided to achieve adaptation of the reverberation frequency characteristic by decreasing a Q value. The resistance R3 is connected in parallel to the transducer 21, the resistance R2, and the capacitor C3 with the switch SW therebetween. The switch SW is a so-called semiconductor switch and is provided to be turned on and off by the control unit 5, that is, the circuit characteristic setting unit 52. While the circuit characteristic setting unit 52 turns on the switch SW during the pre-measurement, the circuit characteristic setting unit 52 turns off the switch SW during the pre-drive, the main drive, and the main measurement.

With reference to FIG. 1 again, the filter characteristic setting unit 53 is provided to set a filtering frequency condition for the filter processing unit 41. That is, the filter characteristic setting unit 53 adjusts a frequency band of signals that pass through the filter processing unit 41 based on changes in transmission frequency that occur as a result of attachment of foreign matter and the like on the transmission/reception surface 23. The transmission frequency is a frequency of the transmission wave. Specifically, the frequency characteristic setting unit 53 adjusts the frequency band based on the measurement result of the reverberation frequency.

The amplitude signal acquiring unit 54 is provided to acquire the amplitude signal from the amplitude signal generating unit 42. The frequency signal acquiring unit 55 is provided to acquire the frequency signal from the frequency signal generating unit 43. The delay correcting unit 56 is provided to correct a delay time that occurs between the amplitude signal and the frequency signal.

The specific segment detecting unit 57 is provided to detect a specific segment. The specific segment is an occurrence segment or a non-occurrence segment. The occurrence segment is a time segment in which occurrence of beat that is attributed to a plurality of reverberation frequency components is confirmed in the reverberation signal. Beat in the reverberation signal is a transient phenomenon that occurs as a result of deviation in the plurality of reverberation frequency components, and accompanies at least one of a relatively large frequency change and a relatively large amplitude distortion. When the reverberation frequency is measured during this occurrence segment, measurement accuracy significantly decreases. In contrast, the non-occurrence segment is a time segment in which the occurrence of beat does not significantly occur. When the reverberation frequency is measured during this non-occurrence segment, the measurement accuracy is favorable.

Therefore, according to the present embodiment, the specific segment detecting unit 57 detects a reverberation clipping segment in which waveform clipping occurs in the amplitude signal that corresponds to the amplitude of the reverberation signal as the occurrence segment, that is, the specific segment. Specifically, the specific segment detecting unit 57 detects, as the occurrence segment, a portion in which the amplitude signal is less than a reverberation clipping determination threshold in a time segment before a foot portion in which the amplitude signal decreases in a converging manner. In addition, the specific segment detecting unit 57 detects the specific segment based on a correction result from the delay correcting unit 56.

The measurement segment setting unit 58 is provided to set a measurement segment in the non-occurrence segment based on the detection result of the specific segment from the specific segment detecting unit 57. According to the present embodiment, the measurement segment is a time segment in which the reverberation frequency is measured, that is, calculated by the pre-measurement. Specifically, the measurement segment setting unit 58 identifies the non-occurrence segment by excluding the occurrence segment from the time segment in which the pre-measurement is performed. Then, the measurement segment setting unit 58 sets the measurement segment in the identified non-occurrence segment. More specifically, the measurement segment setting unit 58 sets the identified non-occurrence segment as the measurement segment.

The reception determining unit 59 is provided to perform various operations such as determination, diagnosis, and detection related to the reception signal based on the amplitude signal that is acquired by the amplitude signal acquiring unit 54 and the frequency signal that is acquired by the frequency signal acquiring unit 55. Specifically, the reception determining unit 59 includes a reverberation measuring unit 591, a diagnostic unit 592, a code determining unit 593, and an object detecting unit 594.

The reverberation measuring unit 591 is provided to measure, that is, calculate the reverberation frequency during the measurement segment that is set by the measurement segment setting unit 58. The reception determining unit 59 delivers the measurement result of the reverberation frequency from the reverberation measuring unit 591 to the transmission control unit 51. In addition, the reception determining unit 59 delivers the measurement result of the reverberation frequency from the reverberation measuring unit 591 to the filter characteristic setting unit 53 for adjustment of a filtering frequency band that is performed in the filter characteristic setting unit 53.

The diagnostic unit 592 is provided to determine presence/absence of occurrence of an abnormality in the transceiver 2 based on the amplitude signal and the frequency signal of the reverberation signal. That is, the diagnostic unit 592 determines the occurrence of disconnection, freezing, attachment of foreign matter, or the like based on the measurement result of the reverberation frequency from the reverberation measuring unit 591. Specifically, the diagnostic unit 592 determines that an abnormality in the transceiver 2 has occurred when the measurement result of the reverberation frequency is outside a normal range that is set in advance based on measurement and the like. In addition, when determined that an abnormality in the transceiver 2 has occurred, the diagnostic unit 592 classifies the abnormality as any of a foreign matter-attached state, a frozen state, and a disconnected state, based on an amount of deviation from the normal range, and outputs the classification result. Here, for example, as such abnormality determination that is based on analysis results of the reverberation signal, abnormality determination that is already publicly known or well known at the time of filing of the present application can be used. Therefore, descriptions of details of the abnormality determination are omitted in the present specification.

The code determining unit 593 is provided to determine a code that corresponds to a frequency modulation mode of the reception wave. Specifically, the code determining unit 593 determines whether the reception wave is a normal wave based on the frequency signal that is acquired by the frequency signal acquiring unit 55 and a predetermined reference signal that is stored in advance. The normal wave is a reception wave when the transceiver 2 receives the reflected wave of the transmission wave that is transmitted from the transceiver 2 itself. In contrast, a reception wave that is attributed to a transmission wave from another apparatus is referred to, hereafter, as a non-normal wave. "Another apparatus" includes another transceiver 2 that is mounted to the own vehicle. Specifically, the code determining unit 593 determines whether the reception wave is a normal wave by performing pattern matching between a waveform of the frequency signal and a waveform of the reference signal.

The object detecting unit 594 is provided to detect the object B based on the reception wave, that is, the reception signal. That is, the object detecting unit 594 is configured to detect the object B based on a code determination result from the code determining unit 593. Specifically, when the reception wave is a normal wave, the object detecting unit 594 detects presence of the object B, and a distance between the transducer 21 and the object B based on the amplitude signal that is acquired by the amplitude signal acquiring unit 54 and the like.

(Operation Overview)

The object detection apparatus 1 according to the present embodiment, as well as an object detection method and an object detection program implemented by the object detection apparatus 1 are hereafter simply referred to as the present embodiment. An overview of operations according to the present embodiment will be described below with reference to the drawings, together with effects achieved according to the present embodiment.

When a predetermined object detection condition is met, the object detection apparatus 1 starts an object detection operation. For example, the object detection condition may include a traveling speed of the own vehicle being within a predetermined range, a shift position of the own vehicle being a traveling position that includes reverse, and the like. When the object detection condition is not met, the object detection apparatus 1 ends the object detection operation.

During the object detection operation, the transmission control unit 51 determines arrival of a transmission-process start timing at a predetermined cycle. For example, the predetermined cycle may be several hundred milliseconds. Determination of the arrival of the transmission-process start timing is performed using a timing means such as a timer that is provided in the control unit. When the transmission-process start timing arrives, the transmission control unit 51 outputs a control signal towards the drive signal generating unit 3. As a result, the transmission process is performed.

Specifically, when the control signal is inputted, the drive signal generating unit 3 generates a drive signal and outputs the drive signal towards the transceiver 2, that is, the transmission/reception circuit 22. The drive signal is outputted from the transmission-process start timing to a transmission-process end timing.

The transmission/reception circuit 22 drives the transducer 21 based on the inputted drive signal. Then, the transducer 21 transmits a transmission wave that is an ultrasonic wave of a frequency that corresponds to the frequency of the drive signal towards the outside of the own vehicle. In this manner, the object detection apparatus 1 repeatedly transmits the transmission waves at a predetermined cycle during the object detection operation. Therefore, the above-described predetermined cycle is also referred to as a transmission cycle.

When the transmission-process end timing arrives, the transceiver 2 outputs a reception signal that is an alternating-current voltage signal. Immediately after the transmission-process end timing, reverberation is generated in the transceiver 2. Therefore, the transceiver 2 outputs a reverberation signal.

During a predetermined receivable period in the object detection operation, the transceiver 2 performs a reception operation. In the configuration according to the present embodiment that is the integrated transmission/reception type, the receivable period is a period between the transmission-process end timing of the present transmission process and the transmission-process start timing of a next transmission process, excluding a dead time that results from effects of reverberation and the like. During the receivable period, the transceiver 2 outputs a reception signal that is the alternating-current voltage signal based on the amplitude and the frequency of the reception wave.

The reception signal processing unit 4 generates the amplitude signal and the frequency signal by performing various types of signal processing on the reception signal. Specifically, the filter processing unit 41 removes noise from the reception signal by performing a filter process on the reception signal. The amplitude signal generating unit 42 generates the amplitude signal based on the reception signal after the filter process by the filter processing unit 41. The frequency signal generating unit 43 generates the frequency signal based on the reception signal after the filter process by the filter processing unit 41. The reception signal processing unit 4 outputs the generated amplitude signal and frequency signal to the control unit 5.

In the control unit 5, the amplitude signal acquiring unit 54 acquires the amplitude signal from the amplitude signal generating unit 42. The frequency signal acquiring unit 55 acquires the frequency signal from the frequency signal generating unit 43. The reception determining unit 59 performs various operations such as determination, diagnosis, and detection related to the reception signal based on the amplitude signal that is acquired by the amplitude signal acquiring unit 54 and the frequency signal that is acquired by the frequency signal acquiring unit 55.

Specifically, the reverberation measuring unit 591 measures the reverberation frequency. The diagnostic unit 592 determines the presence/absence of the occurrence of an abnormality in the transceiver 2 based on the measurement result of the reverberation frequency from the reverberation measuring unit 591. When the occurrence of an abnormality is determined, the diagnostic unit 592 performs a process based on the aspect of the determined abnormality. For example, when the attachment of foreign matter on the transmission/reception surface 23 is determined, the diagnostic unit 592 transmits an attachment determination signal to an external apparatus (not shown). As a result, a warning that indicates that foreign matter such as mud or snow is attached to the ultrasonic sensor is issued to a passenger of the own vehicle.

The code determining unit 593 determines the code that corresponds to the frequency modulation mode of the reception wave during detection of the object B. That is, the code determining unit 593 determines whether the reception wave is a normal wave based on the frequency signal that is acquired by the frequency signal acquiring unit 55 and the predetermined reference signal that is stored in advance. When the reception wave is a normal wave, the object determining unit 594 detects the presence of the object B, and the distance between the transducer 21 and the object B based on the amplitude signal that is acquired by the amplitude signal acquiring unit 54 and the like.

The transmission/reception surface 23 of the transducer 21 is exposed to a space outside the own vehicle in the onboard state. Therefore, foreign matter such as mud or snow may become attached to the transmission/reception surface 23. When foreign matter is attached to the transmission/reception surface 23, the resonance frequency in the transceiver 2 changes. If the drive frequency before the attachment of foreign matter is applied as is regardless of the change in the resonance frequency, transmission/reception characteristics decrease, such as by strength of the transmission wave inadvertently decreasing. In addition, when the transmission wave is chirp-encoded, the modulation mode, that is, a mode of change of the frequency of the transmission wave shifts from a predetermined mode as a result of the attachment of foreign matter. Consequently, recognition rate regarding the code decreases.

In this regard, the reverberation frequency also changes in accompaniment with the change in the resonance frequency caused by the attachment of foreign matter. Therefore, the transmission control unit 51 corrects the drive frequency based on the measurement result of the reverberation frequency of the transceiver 2. In addition, the filter characteristic setting unit 53 adjusts the frequency band of the signals that pass through the filter processing unit 41 to suit the corrected drive frequency. As a result, even in an environment in which foreign matter such as mud or snow easily attaches to the ultrasonic sensor, favorable transmission/reception characteristic and code recognition rate can be achieved.

Here, a predetermined error may occur in the measurement result of the reverberation frequency. In particular, a relatively large error may occur as a result of an instantaneous event such as electrical noise. Therefore, in the correction of the drive frequency based on the measurement result of the reverberation frequency, inappropriate or excessive correction may be performed. In this regard, the transmission control unit 51 guards, that is, restricts the correction value of the drive frequency that is determined based on the measurement result of the reverberation frequency by a guard value. That is, for example, the transmission control unit 51 sets the correction value or an amount of change of the drive frequency to be within a prescribed range. Specifically, for example, the transmission control unit 51 may restrict the correction value of the drive frequency or an absolute value of the amount of change thereof to be equal to or less than a prescribed value. Consequently, inappropriate or excessive correction can be favorably suppressed.

As is well known, when the object B is present within a short-distance range, a reception timing of the reflected wave may occur while reverberation is being generated. In addition, as shown in FIG. 2, in the transceiver 2, the parallel resonant circuit RCp that is attributed to the connection between the transducer 21 and the transmission/reception circuit 22 is formed, in addition to the series resonant circuit RCs that is attributed to the transducer 21. Therefore, the reverberation frequency is affected by a parallel resonance frequency of the parallel resonant circuit RCp, in addition to a series resonance frequency of the series resonant circuit RCs. While a circuit constant of the series resonant circuit RCs changes as a result of the attachment of foreign matter, a circuit constant of the parallel resonant circuit RCp does not change. Therefore, under a transmission/reception condition in which the effects of the parallel resonance frequency increase, the accuracy of abnormality detection and drive frequency correction based on the measurement result of the reverberation frequency may not necessarily be favorable.

Therefore, according to the present embodiment, the pre-drive and the pre-measurement in which the transmission/reception characteristics are reduced are performed before the main drive and the main measurement for detecting the object B. Specifically, at least one of the transmission control unit 51 and the circuit characteristic setting unit 52 serve as the characteristic setting unit that sets the transmission/reception characteristic of the transceiver 2. At least one of the transmission control unit 51 and the circuit characteristic setting unit 52 reduce the transmission/reception characteristics during the measurement of the reverberation frequency by the reverberation measuring unit 591 from that during the detection of the object B by the object detecting unit 594.

Figure 3:
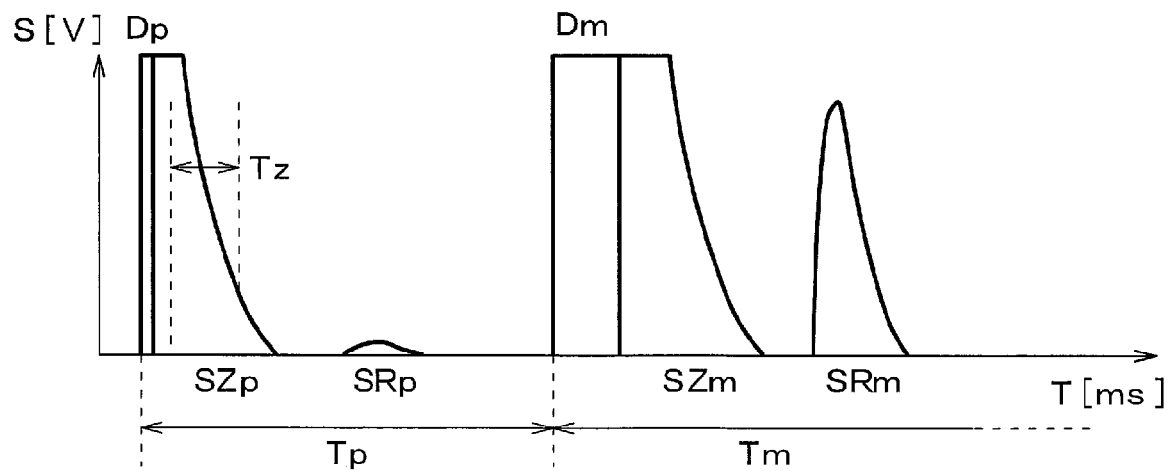
FIG. 3 is a time chart illustrating an example of an operation of the object detection apparatus shown in FIG. 1.

FIG. 3 shows an overview of the pre-drive and the pre-measurement that are performed during a pre-measurement segment Tp, as well as the main drive and the main measurement that are performed during a subsequent main measurement segment Tm. In FIG. 3, a vertical axis S indicates a reception signal and a horizontal axis T indicates time. In addition, Dp indicates the drive signal in the pre-drive and Dm indicates the drive signal in the main drive. SZp indicates the reverberation signal in the pre-measurement and SRp indicates the reception signal of the reflected wave in the pre-measurement. SZm indicates the reverberation signal in the main measurement and SRm indicates the reception signal of the reflected wave in the main measurement. Tz is a measurement segment for the reverberation frequency measurement.

The pre-drive is output of the drive signal that is initially performed immediately after the object detection condition is met. That is, when the object detection condition is met, the object detection apparatus 1 first performs the pre-drive and the pre-measurement and subsequently performs the main drive and the main measurement using the results of the pre-measurement.

The transmission control unit 51 decreases sound pressure during the pre-drive for the pre-measurement that is the measurement of the reverberation frequency by the reverberation measuring unit 591, compared to that during the main drive for the detection of the object B by the object detecting unit 594. That is, the transmission control unit 51 performs the pre-drive under a condition in which the output is decreased from that in the main drive. Specifically, the transmission control unit 51 sets the number of pulses in the pre-drive to be less than the number of pulses in the main drive.

As a result, the effects of the parallel resonant circuit RCp during the measurement of the reverberation frequency can be reduced as much as possible. That is, the occurrence of beat can be favorably suppressed through decrease in the number of pulses. In addition, the effects of the pre-drive on the main drive and the main measurement can be suppressed as much as possible. Furthermore, the effects of the reflected wave from the object B that is present in a short-distance range during the measurement of the reverberation frequency can be reduced as much as possible. Consequently, the measurement of the reverberation frequency, and the abnormality determination and the drive frequency correction that are based on the measured reverberation frequency can be performed with high accuracy. Moreover, the pre-measurement segment Tp can be shortened as much as possible.

According to the present embodiment, the transmission control unit 51 frequency-modulates the transmission wave as the chirp wave during the detection of the object B by the object detecting unit 594. As a result, accuracy of discrimination between the normal wave and the non-normal wave is improved. In particular, as a result of the transmission wave being encoded by a plurality of bits, the accuracy of the differentiation can be further improved.

Meanwhile, when the drive frequency is frequency-modulated, as a result of the reverberation frequency being affected by the drive frequency, accurate and stable measurement of the reverberation frequency becomes difficult. Therefore, the transmission control unit 51 controls the transmission of the transmission wave in the transceiver 2 such that the transmission wave is not frequency-modulated during the measurement of the reverberation frequency by the reverberation measuring unit 591. That is, the drive signal in the pre-drive is a single-frequency CW drive signal. For example, as the single frequency, a design value of the series resonance frequency may be used. Consequently, accurate and stable measurement of the reverberation frequency can be performed.

The circuit characteristic setting unit 52 sets the transmission/reception circuit 22 to have differing circuit characteristics for the pre-measurement that is the measurement of the reverberation frequency by the reverberation measuring unit 591 and for the main measurement for the detection of the object B by the object detecting unit 594. Specifically, the circuit characteristic setting unit 52 sets differing parallel connection states of resistance in the parallel resonant circuit RCp of the transmission/reception circuit 22 for the pre-measurement and the main measurement. More specifically, the circuit characteristic setting unit 52 turns on the switch SW shown in FIG. 2 in the pre-measurement and turns off the switch SW in the main measurement.

Figure 4A:
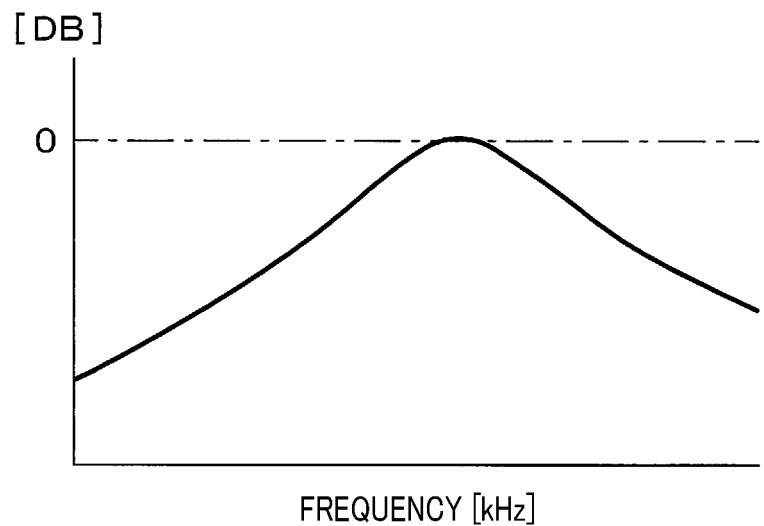
FIG. 4A is a graph illustrating a frequency characteristic when a switch SW is turned on in the circuit diagram shown in FIG. 2.
Figure 4B:
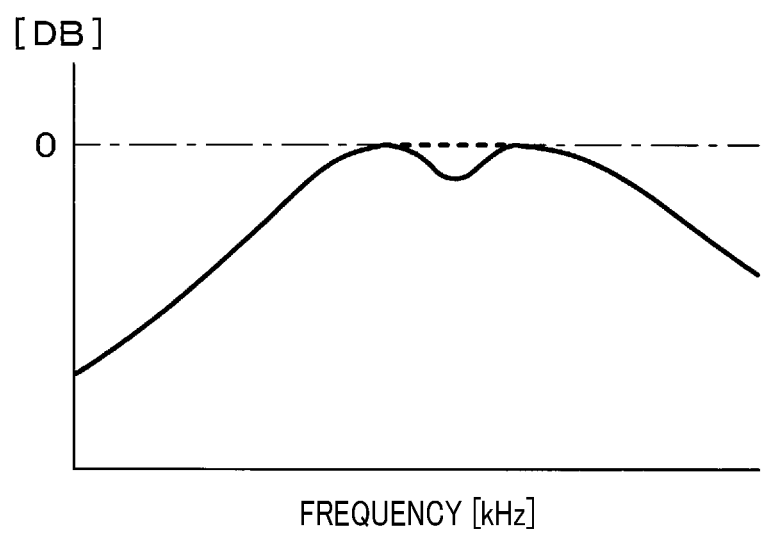
FIG. 4B is a graph illustrating a frequency characteristic when the switch SW is turned off in the circuit diagram shown in FIG. 2.

FIG. 4A shows frequency characteristic of transmission/reception sensitivity of the transceiver 2 when the switch SW is turned on. FIG. 4B shows the frequency characteristic of the transmission/reception sensitivity of the transceiver 2 when the switch SW is turned off.

As shown in FIG. 2, the transceiver 2 has the series resonant circuit RCs and the parallel resonant circuit RCp on the equivalent circuit. Therefore, when a drive frequency that is substantially equal to the series resonance frequency is presumed, the frequency characteristic of the transmission/reception sensitivity when the switch SW is turned off has two peaks that sandwich the drive frequency, as indicated by a solid line in FIG. 4B. The frequencies that correspond to the two peaks are generated as a result of synthesis or reciprocal action of the series resonance and the parallel resonance, and differ from both the series resonance frequency and the parallel resonance frequency. Here, even when the circuit constant such as a resistance value in the parallel resonant circuit RCp is optimized when the switch SW is turned off, the frequency characteristic remains that in which the two peaks are connected in an almost horizontal manner, as indicated by a broken line in FIG. 4B.

Meanwhile, as a result of the switch SW being turned on, a state in which the resistance R2 and the resistance R3 are connected in parallel is actualized. This state is substantially equivalent to the resistance value of the resistance R2 being decreased. In this state, as shown in FIG. 4A, the frequency difference between the two peaks described above decreases, and the state can be typically considered to be the same as a single peak. In this state, beat in the reverberation is reduced. In addition, the difference between the resonance frequency and the reverberation frequency in the transceiver 2 decreases, and accuracy of association between the measured reverberation frequency and the resonance frequency improves. Consequently, the measurement of the reverberation frequency, and the abnormality determination and the drive frequency correction that are based on the measured reverberation frequency can be performed with high accuracy.

Figure 5A:
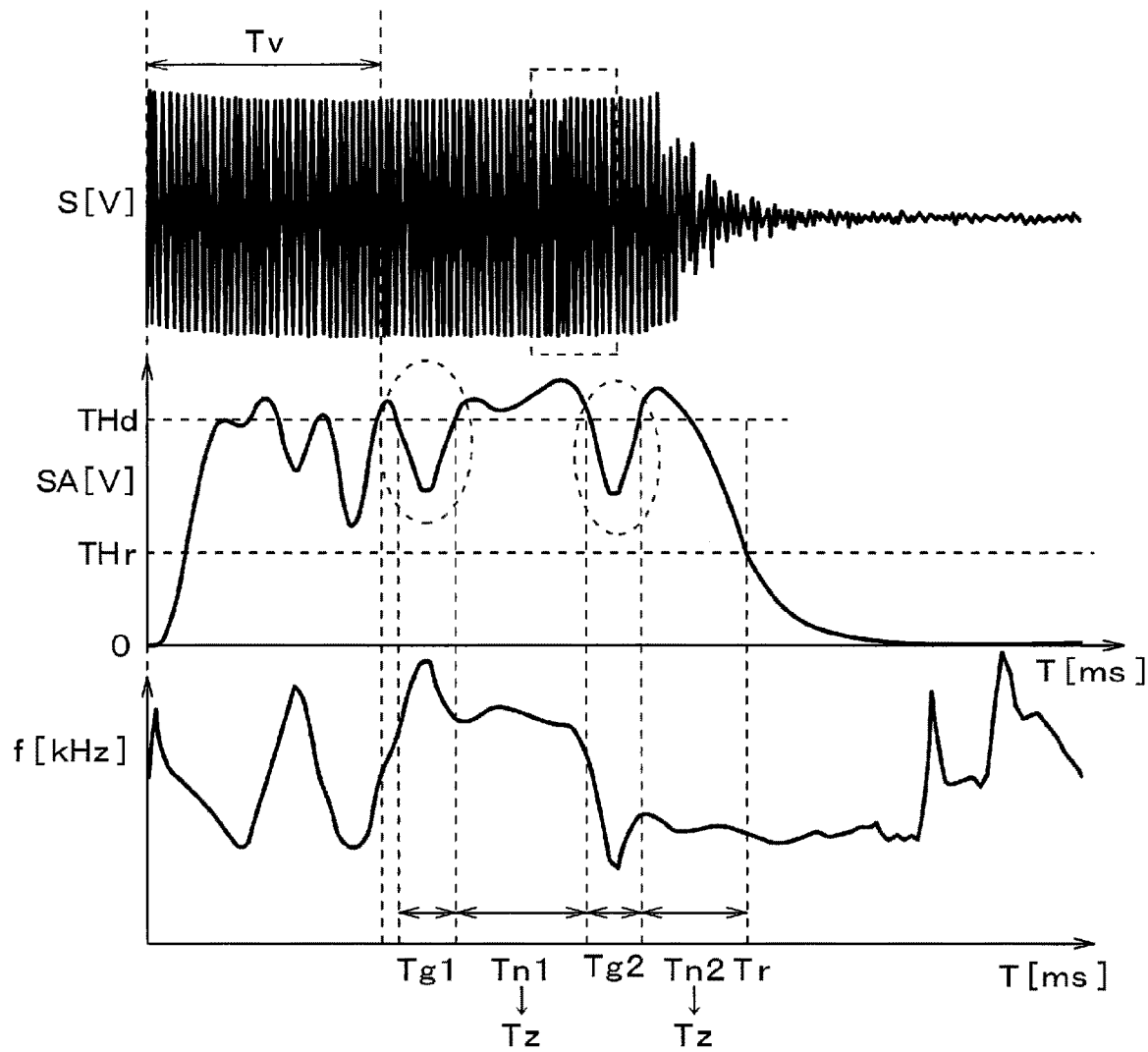
FIG. 5A is a time chart illustrating an overview of an example of a reverberation frequency measurement operation by the object detection apparatus shown in FIG. 1.
Figure 5B:
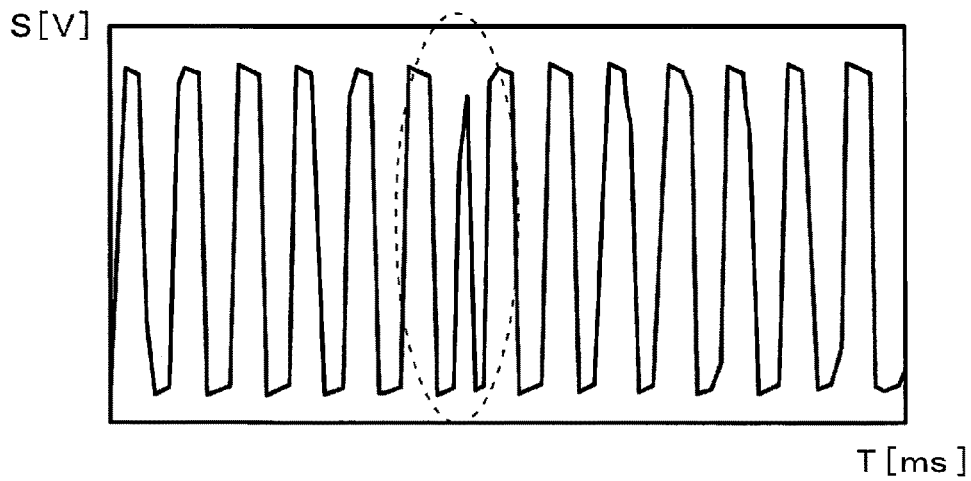
FIG. 5B is a time chart illustrating a portion of FIG. 5A in an enlarged state.

FIGS. 5A and 5B show an example of the reverberation signal. FIG. 5B is an enlarged view of an area that is surrounded by a broken-line rectangle in FIG. 5A. In FIG. 5A and FIG. 5B, a horizontal axis T indicates time and S indicates a reverberation signal waveform. In FIG. 5A, Tv indicates a transmission segment that is an application segment of the drive signal. SA indicates an amplitude signal that corresponds to the reverberation signal, and f indicates a frequency signal. THr is a reverberation time determination threshold. Time that is a predetermined amount of time before a reference time Tr when the amplitude signal decreases to the reverberation time determination threshold THr after the end of the transmission segment Tv can be identified as a starting point of reverberation time that is the time segment in which reverberation is generated.

As described above, the reverberation frequency is affected by the parallel resonance frequency of the parallel resonant circuit RCp, in addition to the series resonance frequency of the series resonant circuit RCs. Beat occurs in the reverberation signal as a result of a plurality of reverberation frequency components being generated in this manner. The beat that occurs in the reverberation signal manifests as waveform clipping in the reverberation signal and the amplitude signal that corresponds to the amplitude thereof, as shown in portions surrounded by broken-line ellipses in FIGS. 5A and 5B.

In a time segment that includes beat or waveform clipping, as in time segments Tg1 and Tg2 in FIG. 5A, a peak-like reverberation frequency that significantly deviates from the frequency characteristic of the transceiver 2 is observed. Therefore, when the reverberation frequency is measured during such a time segment, the measurement accuracy significantly decreases. Meanwhile, in a time segment in which waveform clipping does not occur, as in time segments Tn1 and Tn2, a width of change in the reverberation frequency decreases. In such a time segment, favorable measurement accuracy regarding the reverberation frequency can be achieved.

Therefore, the specific segment detecting unit 57 detects the specific segment that is the occurrence segment in which the occurrence of beat that is attributed to a plurality of reverberation frequency components in the reverberation signal is confirmed or the non-occurrence segment in which the occurrence of beat does not significantly occur. Then, the measurement segment setting unit 58 sets the measurement segment for measuring the reverberation frequency by the reverberation measuring unit 591 in the non-occurrence segment based on the detection result of the specific segment.

Specifically, according to the present embodiment, the specific segment detecting unit 57 detects the reverberation clipping segment in which waveform clipping occurs in the amplitude signal that corresponds to the amplitude of the reverberation signal as the occurrence segment. In the example in FIG. 5A, the specific segment detecting unit 57 detects, as the occurrence segment, a portion in which the amplitude signal is less than the reverberation clipping determination threshold THd in the time segment before the foot portion in which the amplitude signal of the reverberation decreases in a converging manner. In the example in FIG. 5A, the occurrence segment that is the detected specific segment is a first occurrence segment Tg1 and a second occurrence segment Tg2. The foot portion is a time segment of a predetermined range near time Tr.

The non-occurrence segment can be identified based on the detected occurrence segment. That is, the non-occurrence segment can be identified by the occurrence segment being excluded from the reverberation time. Specifically, in the example in FIG. 5A, a first non-occurrence segment Tn1 and a second non-occurrence segment Tn2 are identified by the first occurrence segment Tg1 and the second occurrence segment Tg2 being excluded from the reverberation time that is identified by the reference time Tr. The first non-occurrence time Tn1 can also be referred to as an intermediate non-beat segment that is a non-occurrence segment in a time segment before the foot portion. The second non-occurrence segment Tn2 includes the foot portion.

Then, the measurement segment setting unit 58 sets the measurement segment in the non-occurrence segment that is the time segment from which the occurrence segment is excluded. Specifically, in the example in FIG. 5A, the measurement segment setting unit 58 sets the measurement segment in each of the first non-occurrence segment Tn1 that is the intermediate non-beat segment and the second non-occurrence segment Tn2 that includes the foot portion. That is, the measurement segment setting unit 58 sets the first non-occurrence segment Tn1 and the second non-occurrence segment Tn2 as the measurement segment Tz.

According to the present embodiment, the reverberation frequency is measured during the non-occurrence segment in which the occurrence of beat does not significantly occur. In particular, in the foot portion, a trend in which the reverberation frequency converges on a fixed value is shown, as is clear from a manner of change in the reverberation frequency in the second non-occurrence segment Tn2 shown in FIG. 5A. Therefore, the measurement accuracy regarding the reverberation frequency improves. In addition, the abnormality determination and the drive frequency correction that are based on the measured reverberation frequency can be performed with high accuracy.

Here, a delay time due to a difference in processing time between the amplitude signal generating unit 42 and the frequency signal generating unit 43 may occur between the amplitude signal and the frequency signal. Specifically, the filter process is required for the amplitude signal to be generated in the amplitude signal generating unit 42. Therefore, when the frequency signal is generated in the frequency signal generating unit 43 by a zero-cross method or the like, a relatively large delay time occurs.

Therefore, the delay correcting unit 56 corrects the delay time that occurs between the amplitude signal that corresponds to the amplitude of the reverberation signal and the frequency signal that corresponds to the reverberation frequency. Then, the specific segment detecting unit 57 detects the specific segment based on the correction result from the delay correcting unit 56. Consequently, setting of the measurement segment can be appropriately performed.

According to the present embodiment, the diagnostic unit 592 determines the presence/absence of the occurrence of an abnormality in the transceiver 2 based on the reverberation frequency that is measured with favorable accuracy as described above. Specifically, in the example in FIG. 5A, the reverberation frequency in the first non-occurrence segment Tn1 is attributed to both the series resonance and the parallel resonance. The reverberation frequency in the second non-occurrence segment Tn2 is mainly attributed to the series resonance, that is, mechanical vibration characteristic of the transducer 21. In this manner, differing information can be included in the reverberation frequency of each of the plurality of non-occurrence segments.

Therefore, the measurement segment setting unit 58 sets the measurement segment Tz in each of the plurality of non-occurrence segments. In the example in FIG. 5A, the measurement segment Tz is set in each of the first non-occurrence segment Tn1 before the foot portion and the second non-occurrence segment Tn2 that includes the foot portion. Then, the diagnostic unit 592 diagnoses an abnormality in the transceiver 2 based on the measurement result of the reverberation frequency in each of the plurality of measurement segments Tz.

That is, for example, the diagnostic unit 592 diagnoses the presence/absence of the attachment of foreign matter based on the measurement result of the reverberation frequency in the second non-occurrence segment Tn2 that is the time segment that corresponds to the foot portion. Consequently, a highly accurate determination of the attachment of foreign matter can be performed. In addition, for example, the diagnostic unit 592 determines the presence/absence of the occurrence of an abnormality in the transceiver 2 based on the measurement result of the reverberation frequency in the first non-occurrence segment Tn1 that is the time segment before the foot portion, in addition to the second non-occurrence segment Tn2 that is the time segment that corresponds to the foot portion. Consequently, according to the present embodiment, a highly accurate abnormality determination can be performed.

According to the present embodiment, the transmission control unit 51 corrects the drive frequency of the transceiver 2 based on the reverberation frequency that is measured with favorable accuracy as described above. Consequently, favorable transmission/reception characteristic can be achieved. In particular, when the transmission wave is chirp-encoded, a favorable code recognition rate can be achieved.

As described in detail above, according to the present embodiment, analysis of the reverberation signal can be performed with as much accuracy as possible. In addition, according to the present embodiment, various operations such as transmission frequency correction and abnormality detection can be appropriately performed based on an accurate analysis result of the reverberation signal. In particular, in reverberation frequency measurement, if a measurement method, such as the zero-cross method or quadrature detection, that uses instantaneous values is used instead of FFT (that is, Fast Fourier Transform) to reduce calculation load, decrease in accuracy as a result of beat may become significant. In this regard, according to the present embodiment, reverberation frequency measurement results can be acquired with favorable measurement accuracy while calculation load is decreased even in the zero-cross method and the like.

Operation Examples

Hereafter, an example of specific operations or processes according to the present embodiment will be described with reference to flowcharts shown in FIGS. 6 to 8. Here, in the drawings, step is simply abbreviated as S.

Figure 6:
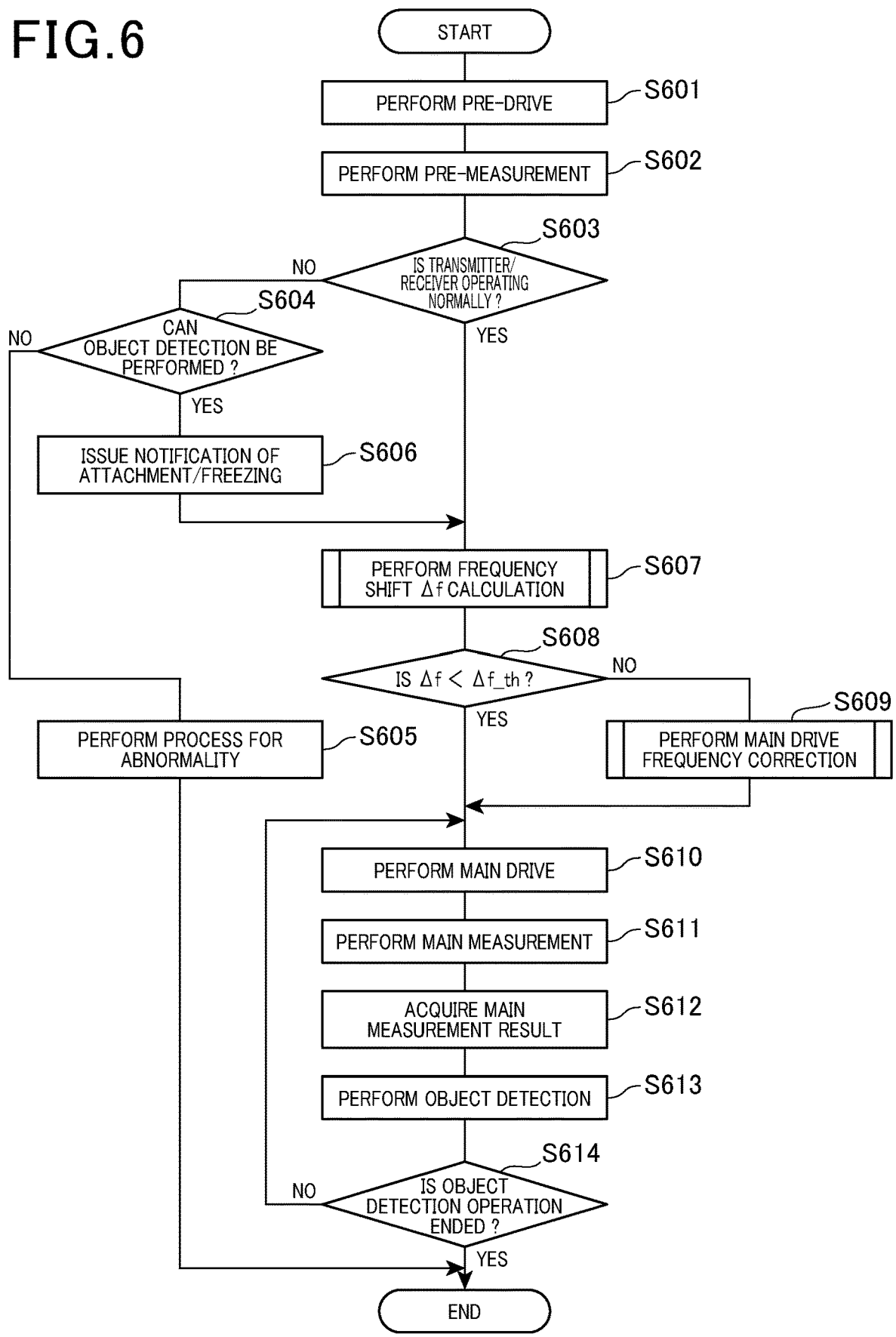
FIG. 6 is a flowchart illustrating an example of an operation of the object detection apparatus shown in FIG. 1.

When the object detection condition is met, the object detection apparatus 1, that is, the CPU of the control unit 5 starts the object detection operation shown in the flowchart in FIG. 6. When the object detection operation is started, first, at step S601, the object detection operation 1 performs the pre-drive. Specifically, the object detection apparatus 1 transmits a low-output transmission wave for the pre-measurement by driving the transducer 21 using the predetermined CW drive signal that has a small number of pulses. Here, when the number of pulses is one or two, the drive signal is inevitably a CW drive signal even when a process to change the drive frequency pattern is not performed. That is, in the pre-drive, even if a drive frequency pattern for the main drive, that is, a chirp wave is used, the drive signal and the transmission wave that are CW wave-like can be actualized simply by the number of pulses being decreased.

Next, at step S602, the object detection apparatus 1 performs the premeasurement. The premeasurement is started immediately after the end of the pre-drive segment or at a predetermined timing after the end of the pre-drive segment. In the premeasurement, the object detection apparatus 1 measures the reverberation frequency based on the amplitude signal and the frequency signal of the reverberation signal.

Next, at step S603, the object detection apparatus 1 determines the presence/absence of the occurrence of an abnormality in the transceiver 2 based on the measured reverberation frequency. That is, the object detection apparatus 1 determines the presence/absence of the occurrence of an abnormality and the type of abnormality based on the measured reverberation frequency and a predetermined reference value. For example, as the reference value for the reverberation frequency, a design value, a measurement value at the time of shipping of the object detection apparatus 1 from a factory, or the like can be used.

When an abnormality of some kind occurs in the transceiver 2 (that is, NO at step S603), the object detection apparatus 1 advances the process to step S604. At step S604, the object detection apparatus 1 determines whether the abnormality that is determined or detected is a type in which the object detection operation can be continued, such as the attachment of foreign matter, freezing, or the like.

When the abnormality is that in which the object detection operation cannot be continued (that is, NO at step S604), the object detection apparatus 1 ends the object detection operation after performing the process at step S605. For example, an abnormality in which the object detection operation cannot be continued may be disconnection or the like.

At step S605, the object detection apparatus 1 performs various processes for when an abnormality in which the object detection operation cannot be continued occurs. Specifically, for example, the object detection apparatus 1 performs a process that is required to notify at least one of a passenger of the own vehicle and a service workshop or the like of the occurrence of an abnormality in the transceiver 2.

When the abnormality is that in which the object detection operation can be continued (that is, YES at step S604), the object detection apparatus 1 advances the process to step S607 after performing the process at step S606. At step S606, the object detection apparatus 1 performs a process that is required to notify the passenger of the own vehicle that attachment of foreign matter or freezing has occurred in the transceiver 2. In addition, when the transceiver 2 is operating normally (that is, YES at step S603), the object detection apparatus 1 advances the process to step S607.

At step S607, the object detection apparatus 1 calculates a frequency shift $\Delta f$. In the present operation example, the frequency shift $\Delta f$ is an amount of shift in the resonance frequency in the transceiver 2. Details of a process for calculating the frequency shift $\Delta f$ at step S607 will be described hereafter with reference to the flowchart in FIG. 7. Subsequently, the object detection apparatus 1 advances the process to step S608.

At step S608, the object detection apparatus 1 determines whether the frequency shift $\Delta f$ is less than a threshold $\Delta f\_th$. When the frequency shift $\Delta f$ is equal to or greater than the threshold $\Delta f\_th$ (that is, NO at step S608), the object detection apparatus 1 advances the process to step S610 and subsequent steps after performing the process at step S609. In contrast, when the frequency shift $\Delta f$ is less than the threshold $\Delta f\_th$ (that is, YES at step S608), the object detection apparatus 1 skips the process at step S609 and advances the process to step S610 and subsequent steps.

At step S609, the object detection apparatus 1 performs a correction process for a main drive frequency. The main drive frequency is the drive frequency in the main drive. Details of the process to correct the main drive frequency at step S609 will be described hereafter with reference to the flowchart in FIG. 8.

The object detection apparatus 1 performs the processes at steps S610 to S614 in order. First, at step S610, the object detection apparatus 1 performs the main drive. Specifically, the object detection apparatus 1 transmits the transmission wave for the main measurement to which a code corresponding to the frequency modulation mode is added by driving the transducer 21 using the chirp drive signal.

Next, at step S611, the object detection apparatus 1 performs the main measurement. Next, at step S612, the object detection apparatus 1 acquires the main measurement results, that is, the amplitude signal and the frequency signal in the main measurement through the control unit 5. Then, at step S613, the object detection apparatus 1 detects the object B based on the acquired main measurement results.

At step S614, the object detection apparatus 1 determines whether to end the object detection operation. For example, the object detection operation may be ended when the object detection condition changes from met to not met. Alternatively, for example, the object detection operation may be ended when a predetermined ending operation is performed by the passenger of the own vehicle or the like.

When the object detection operation is continued (that is, NO at step S614), the object detection apparatus 1 returns the process to step S610 and performs the processes at steps S610 to S614 again. Meanwhile, when the object detection operation is ended (that is, YES at step S614), the object detection apparatus 1 ends the object detection operation.

Figure 7:
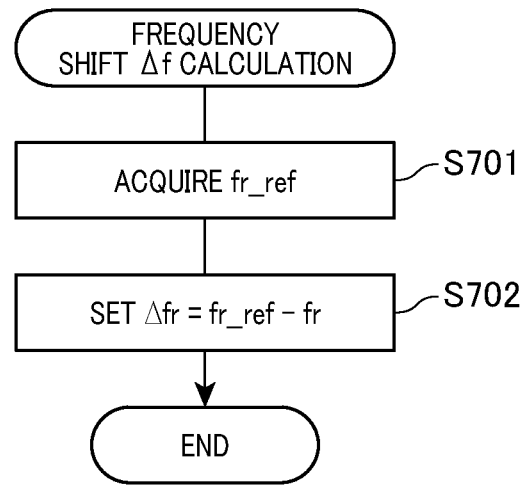
FIG. 7 is a flowchart illustrating an example of a frequency shift calculation process shown in FIG. 6.

FIG. 7 shows an example of a calculation process for the frequency shift $\Delta f$ at step S607 in the flowchart shown in FIG. 6. In the calculation process for the frequency shift $\Delta f$, the object detection apparatus 1 performs processes at steps S701 and S702 in order.

At step S701, the object detection apparatus 1 acquires a reference value fr_ref of the reverberation frequency. Specifically, the CPU of the control unit 5 reads the reference value fr_ref of the reverberation frequency from the ROM or the non-volatile rewritable memory.

At step S702, the object detection apparatus 1 calculates the frequency shift $\Delta f$ that is the amount of shift in the resonance frequency in the transceiver 2 based on the measurement result of a reverberation frequency fr. Specifically, the frequency shift $\Delta f$ is a difference of the measured reverberation frequency fr from the reference value fr_ref.

In this manner, in the present specific example, the frequency shift $\Delta f$ that is the amount of shift in the resonance frequency in the transceiver 2 is calculated based on the amount of shift in the reverberation frequency fr from the reference value fr_ref.

Figure 8:
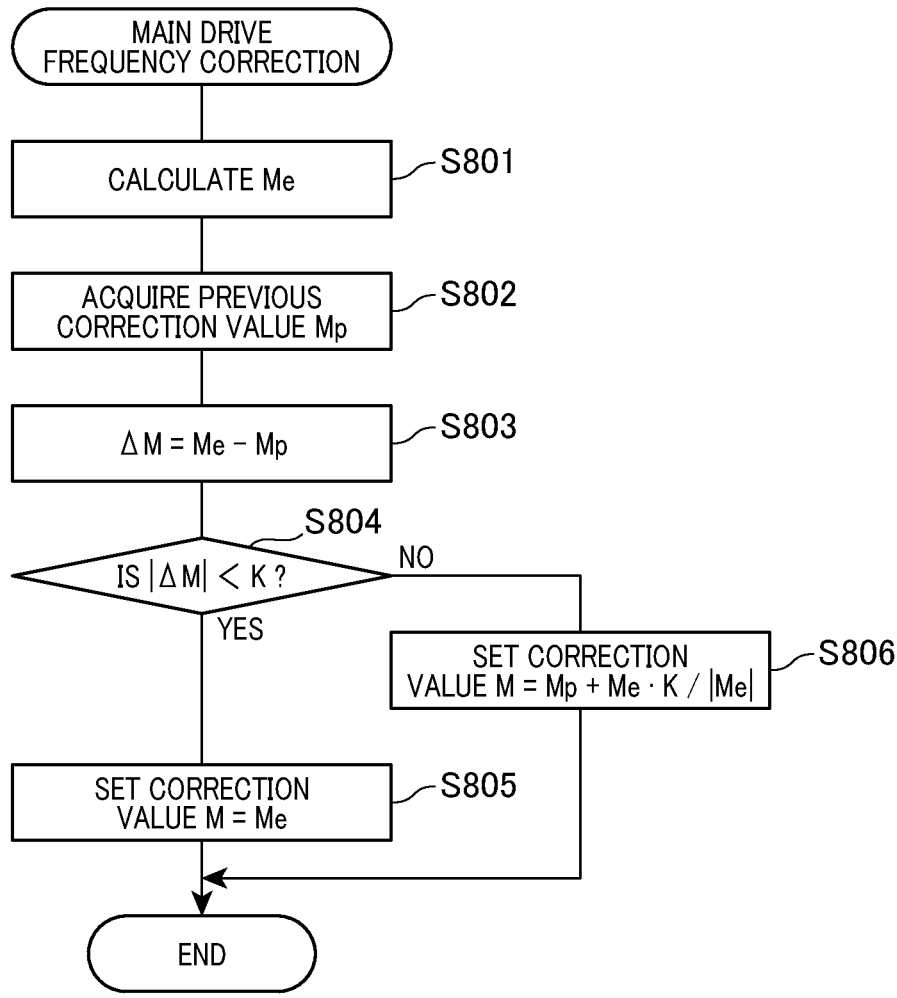
FIG. 8 is a flowchart illustrating an example of a main drive frequency correction process shown in FIG. 6.

FIG. 8 shows an example of a correction process for the main drive frequency at step S609 in the flowchart shown in FIG. 6. In the correction process for the main drive frequency, the object detection apparatus 1 first performs processes at steps S801 to S804 in order.

At step S801, the object detection apparatus 1 acquires or calculates a provisional correction value Me based on the frequency shift $\Delta f$. For example, the provisional correction value Me can be calculated using the frequency shift $\Delta f$ and a predetermined calculation formula. Specifically, for example, the provisional correction value Me can be calculated by a sum or product of the frequency shift $\Delta f$ and a value fc that corresponds to temperature correction or the like. Alternatively, for example, the provisional correction value Me can be acquired using a map or a lookup table in which at least the frequency shift $\Delta f$ is a parameter.

At step S802, the object detection apparatus 1 acquires a previous correction value Mp. The previous correction value Mp is a correction value M of when step S609 in the flowchart shown in FIG. 6 had been previously performed. Specifically, the CPU of the control unit 5 reads the previous correction value Mp from the RAM or the non-volatile rewritable memory.

At step S803, the object detection apparatus 1 calculates a correction value difference $\Delta M$. The correction value difference $\Delta M$ is a difference between the provisional correction value Me that is acquired or calculated at a current step S801 and the previous correction value Mp. At step S804, the object detection apparatus 1 determines whether an absolute value of the correction value difference $\Delta M$ is less than a predetermined value K. The predetermined value K is a positive number and corresponds to an absolute value of the guard value for the correction value M of the drive frequency.

When the absolute value of the correction value difference $\Delta M$ is less than the predetermined value K (that is, YES at step S804), the object detection apparatus 1 ends the correction process for the main drive frequency after performing the process at step S805. At step S805, the object detection apparatus 1 sets the provisional correction value Me as the current correction value M. The set correction values are stored in the RAM or the non-volatile rewritable memory such as to amount to a predetermined amount of time in time series.

When the absolute value of the correction value difference $\Delta M$ is equal to or greater than the predetermined value K (that is, NO at step S804), the object detection apparatus 1 ends the correction process for the main drive frequency after performing the process at step S806. At step S806, the object detection apparatus 1 sets a value that is obtained by adding a value that is a product of the predetermined value K and the provisional correction value Me divided by an absolute value of the provisional correction value Me to the previous correction value Mp as the current correction value M. As a result, the current correction value M is guarded by K or −K. The set correction values M are stored in the RAM or the non-volatile rewritable memory such as to amount to a predetermined amount of time in time series.

(Modifications)

The present disclosure is not limited to the above-described embodiment. Therefore, various modifications to the above-described embodiment are possible. Hereafter, typical modifications will be described. In the descriptions of the modifications below, differences with the above-described embodiment will mainly be described. In addition, sections according to the above-described embodiment and in the modifications that are identical or equivalent are given the same reference numbers. Therefore, in the description of the modifications below, the description according to the above-described embodiment may be applied as appropriate regarding constituent elements that have the same reference number as those according to the above-described embodiment, unless technical inconsistencies or special additional descriptions are present.

The present disclosure is not limited to the specific apparatus configuration described according to the above-described embodiment. For example, the object detection apparatus 1 is not limited to the onboard configuration, that is, the configuration that is mounted to the vehicle V. Therefore, specifically, for example, the object detection apparatus 1 can also be mounted to a ship or an aircraft.

The object detection apparatus 1 is not limited to the configuration in which one each of the transceiver 2 and the drive signal generating unit 2 are provided, as shown in FIG. 1. That is, the object detection apparatus 1 may include a plurality of transceivers 2. In this case, the same number of drive signal generating units 3 as the number of transceivers 2 is provided.

Among the constituent elements of the parallel resonant circuit RCp, at least any one of the capacitor C3, the resistance R2, and the transformer secondary-side winding that corresponds to the inductance LT may be omitted. Specifically, for example, when the parallel resonance is formed by the capacitance C2 of the transducer 21 and the inductance Lt of the transformer secondary-side winding, the capacitor C3 may not be provided. In the case of a configuration in which an inverter is driven, the transformer is unnecessary. The configuration may be such that the resistance R3 is not provided for the purpose of achieving high sensitivity in the main measurement. However, the present disclosure is effective in this case as well.

The electromechanical energy conversion element that is provided in the transducer 21 is not limited to the piezoelectric element. That is, for example, a capacitance-type element can be used as the electromechanical energy conversion element.

A case in which a two-dimensional position of the object B in relation to the own vehicle is detected by triangulation using a plurality of transducers 21 is possible. In this case, for example, from each of the plurality of transducers 21 that are mounted to the own vehicle, transmission waves that have same frequency characteristic, that is, code may be transmitted. At this time, the normal wave is a reception wave when a reflected wave of a transmission wave that is transmitted from the own vehicle is received by the own vehicle. In contrast, the non-normal wave is a reception wave when a reflected wave of a transmission wave that is transmitted from another vehicle is received by the own vehicle. Consequently, effects of interference between a plurality of vehicles can be favorably suppressed.

Alternatively, for example, from each of the plurality of transducers 21 that are mounted to the own vehicle, transmission waves that have differing frequency characteristic, that is, code sequences may be transmitted. Consequently, distinction between a direct wave in which both the transducer 21 on the transmission side and the transducer 21 on the reception side are the same, and an indirect wave in which the transducer 21 on the transmission side and the transducer 21 on the reception side differ from each other can be facilitated. Moreover, erroneous recognition due to effects of multipath reflection and the like can be favorably suppressed.

The object detection apparatus 1 is not limited to the configuration in which the transceiver 2, the drive signal generating unit 3, the reception signal processing unit 4, and the control unit 5 are supported by a single sensor housing. For example, all or at least a portion of the functional configurations that are provided by the drive signal generating unit 3, the reception signal processing unit 4, and the control unit 5 may be provided outside of the sensor housing in the ultrasonic sensor.

At least a portion of the constituent elements among the drive signal generating unit 3, the reception signal processing unit 4, and the control unit 5 may be provided in the above-described external apparatus. Specifically, for example, at least a portion of the transmission control unit 51 to the reception determining unit 59 may be provided in the external apparatus.

At least one of the drive signal generating unit 3 and the reception signal processing unit 4 may be provided in the control unit 5. Specifically, for example, the amplitude signal generating unit 42 and the amplitude signal acquiring unit 54 may be integrated. Alternatively, the frequency signal generating unit 43 and the frequency signal acquiring unit 55 may be integrated.

According to the present embodiment, the functional configurations and methods described above are actualized by a dedicated computer that includes a CPU and the like. The dedicated computer is provided by a processor and a memory, the processor being programmed to provide one or a plurality of functions that are realized by a computer program. However, the present disclosure is not limited to this mode. That is, the control unit 5 is not limited to a known microcomputer that includes a CPU and the like.

Specifically, for example, the functional configurations and methods described above may be actualized by a dedicated computer that is provided by a processor being configured by a single dedicated hardware logic circuit or more. Alternatively, the functional configurations and methods described above may be actualized by a single dedicated computer or more, the dedicated computer being configured by a combination of a processor that is programmed to provide one or a plurality of functions, a memory, and a processor that is configured by a single hardware logic circuit or more. That is, the control unit 5 may, in its entirety or in part, be a digital circuit, such as an ASIC or an FPGA of a gate array or the like, that is configured to be capable of actualizing functions such as those described above. ASIC is an abbreviation of Application Specific Integrated Circuit. FPGA is an abbreviation of Field Programmable Gate Array.

In addition, the computer program may be stored in a non-transitory computer-readable (tangible) storage medium that can be read by a computer as instructions performed by the computer. That is, the apparatus and method of the present disclosure can be expressed as a computer program that includes steps for actualizing the functions or methods described above, or a non-transitory computer-readable (tangible) storage medium in which the program is stored.

According to the above-described embodiment, the control unit 5 is provided with functional constituent elements that configure features of the present disclosure. Therefore, the apparatus of the present disclosure can be implemented as a control unit 5 that serves as the object detection apparatus. However, the present disclosure is not limited to this mode. That is, for example, the apparatus of the present disclosure can also be rated as being the object detection apparatus 1 that includes the transceiver 2 and the like. Alternatively, when a portion of the transmission control unit 51 to the reception determining unit 59 is provided in the external apparatus, the apparatus of the present disclosure can also be rated as being at least one of the object detection apparatus 1 and the external apparatus.

The present disclosure is not limited to the specific operation modes and processing modes described according to the above-described embodiment. For example, in the specific example described above, the pre-measurement is performed every time the object detection condition is met during a single trip. However, the present disclosure is not limited to this mode. That is, for example, the pre-measurement is merely required to be performed once during a single trip. Specifically, for example, if the pre-measurement is performed at the time the object detection condition is initially met during a single trip, the pre-measurement may not be performed until the ignition switch is subsequently turned off.

The code or the code sequence of the drive signal is not particularly limited. That is, for example, when an upchirp is 1, CW is 0, and downchirp is −1, a code of one or more digits that includes at least either of 1 and −1 can be added to the drive signal. Specifically, for example, a code sequence such as: 1, 0; −1, 0; 1, 1, 0; 1, 0, −1; or 1, 1, 0, −1 can be applied. In addition, a so-called V-shaped chirp may be used for the upchirp and the downchirp. Furthermore, the code or the code sequence of the drive signal may be variable or may be invariable.

As the code or the code sequence becomes more complex to improve the accuracy of discrimination, the accuracy of discrimination may instead decrease as a result of the transmission frequency changing as a result of the attachment of foreign matter or the like. In addition, as described above, in a conventional measurement technology for the reverberation frequency, accurate measurement of the reverberation frequency is difficult because of the effects of the parallel resonant circuit RCp. In this regard, in the present disclosure, the drive frequency, that is, the transmission frequency can be favorably corrected based on the results of an accurate and stable measurement of the reverberation frequency. Therefore, in the present disclosure, improvement in the accuracy of discrimination as a result of the code or the code sequence being made more complex can be achieved with further certainty.

Switching of the transmission/reception characteristics between the pre-drive and the premeasurement, and the main drive and the main measurement may be performed for only the transmission characteristic or only the reception characteristic. Alternatively, this switching may be performed in only either of the transmission control unit 51 and the circuit characteristic setting unit 52. When the switching is performed in only the transmission control unit 51, the circuit characteristic setting unit 52 may be omitted.

During the pre-drive, instead of the reduced number of pulses or in addition thereto, at least any one of the following may be used.

M1: The drive frequency is shifted from the resonance frequency of the transceiver 2.
M2: The drive current is decreased from that for the main drive.
M3: The drive voltage is decreased from that for the main drive.
M4: The duty ratio is decreased from that for the main drive.
M5: The switch SW is turned on.

In the case of above-described M1, the drive frequency for the pre-drive is set to a value that is away from a median value in a predetermined transmission/reception frequency band. Specifically, for example, the drive frequency can be set to a value that is near an upper limit value or a lower limit value of the transmission/reception frequency band. Here, the predetermined transmission/reception frequency band is a range in which $Si=0$ to $Sib$ [dB], when output or sensitivity is $Si$, and $Si=0$ [dB] at a resonance frequency $f0$. For example, $Sib$ is typically −3 [dB]. The sensitivity is sensitivity when the transducer 21 is used as a receiver. Here, a transmission/reception frequency band such as this can also be referred to as a resonance band, a −3 dB band, or a 3 dB band.

As in above-described M5, the circuit characteristic setting unit 52 may turn on the switch SW not only for the pre-measurement but also for the pre-drive. As a result, the output of the drive signal in the pre-drive can be suppressed to a degree that is required for reverberation signal analysis while suppressing reception of unnecessary reflected waves.

If accurate measurement of the reverberation frequency is achieved, the pre-measurement is not necessarily required to be performed. That is, the effect of improving measurement accuracy through the present disclosure can be achieved even in a mode in which the pre-measurement is not performed and the reverberation frequency is measured during a reverberation generation period immediately after drive in the main measurement. Specifically, for example, the reverberation frequency can be accurately measured by the switch SW being turned on during the reverberation frequency measurement segment.

The circuit characteristics that are changed by the circuit characteristic setting unit 52 is not limited to a resistance component. That is, for example, instead of the resistance component or in addition thereto, at least one of a capacitance component and an inductance component may be changed.

For example, as a method for changing the characteristic of the parallel resonant circuit RCp, there is also a method in which the transformer secondary-side winding that corresponds to the inductance LT or the capacitor C3 is cut off by a switch. As a result of the transformer secondary-side winding that corresponds to the inductance LT or the capacitor C3 being cut off, the parallel resonance frequency shifts. Therefore, an effect of reducing beat can be achieved.

The method for calculating the amount of shift in the resonance frequency in the transceiver 2 is also not limited to the specific example described above. That is, for example, the frequency shift $\Delta f$ can be calculated based on a reverberation frequency shift $\Delta fr$. The reverberation frequency shift $\Delta fr$ is a difference between the measured reverberation frequency $fr$ and the reference value $fr\_ref$. Specifically, for example, the frequency shift $\Delta f$ can be calculated using the reverberation frequency shift $\Delta fr$ and a predetermined calculation formula. Alternatively, for example, the frequency shift $\Delta f$ can be acquired using a map or a lookup table of which the reverberation frequency shift $\Delta fr$ is a parameter. Still alternatively, for example, instead of the frequency shift Δf, a frequency change rate Rf can be used. In this case, when described in terms of the specific example described above, the frequency change rate Rf can be calculated by Rf=fr/fr_ref using the measured reverberation frequency fr and the reference value fr_ref.

The correction value M of the drive signal is not limited to being determined by the difference between the provisional correction value Me and the previous correction value Mp. Specifically, for example, when the above-described frequency change rate Rf is used, the correction value M may be a ratio of the provisional correction value Me and the previous correction value Mp. In this case, the drive signal after correction is determined by multiplying or dividing by the correction value M. That is, the correction value M is not limited to being determined by the difference between the measurement value fr of the reverberation frequency and the reference frequency fr_ref. Specifically, the correction value M may be determined by a ratio of the measurement value fr of the reverberation frequency and the reference frequency fr_ref.

The correction value M of the drive signal is not limited to being determined by a comparison with the previous correction value Mp. Specifically, the comparison may be with an initial value that is normally measured.

The method for restricting, that is, guarding the correction value M is also not limited to the specific example described above. That is, for example, the correction value M may be provided with an upper limit value and a lower limit value. Absolute values may be the same or may differ between the upper limit value and the lower limit value of the correction value M.

In addition, for example, the correction value may be restricted based on a ratio to the previous correction value Mp. Specifically, for example, the provisional correction value Me=Rf Rc·Rc is a value that corresponds to temperature correction or the like. In addition, a correction value ratio RMe=Me/Mp. In this case, when RMe<KL, the correction value M=KL Mp. Meanwhile, when RMe>KH, the correction value M=KH Mp. Furthermore, when KL≤RMe≤KH, the correction value M=Me. Alternatively, for example, the correction value M may be calculated based on a result of a moving average of the measurement value fr of the reverberation frequency from past history. Consequently, the effect of restricting the correction value M can be achieved.

According to the above-described embodiment, the specific segment detecting unit 57 detects the occurrence segment that serves as the specific segment. As a result, the non-occurrence segment can be identified. Therefore, the specific segment detecting unit 57 can be rated as, by directly detecting the occurrence segment that serves as a first type of specific segment, indirectly detecting the non-occurrence segment that serves as a second type of specific segment that differs from the first type. Specifically, in the example in FIG. 5A, the specific segment detecting unit 57 can be rated as detecting the first non-occurrence segment Tn1 and the second non-occurrence segment Tn2 as well, by detecting the first occurrence segment Tg1 and the second occurrence segment Tg2.

However, the present disclosure is not limited to this mode. That is, for example, the specific segment detecting unit 57 may directly detect the non-occurrence segment that serves as the specific segment. Specifically, the specific segment detecting unit 57 may detect the foot portion as the specific segment based on the amplitude signal that corresponds to the amplitude of the reverberation signal.

Figure 9:
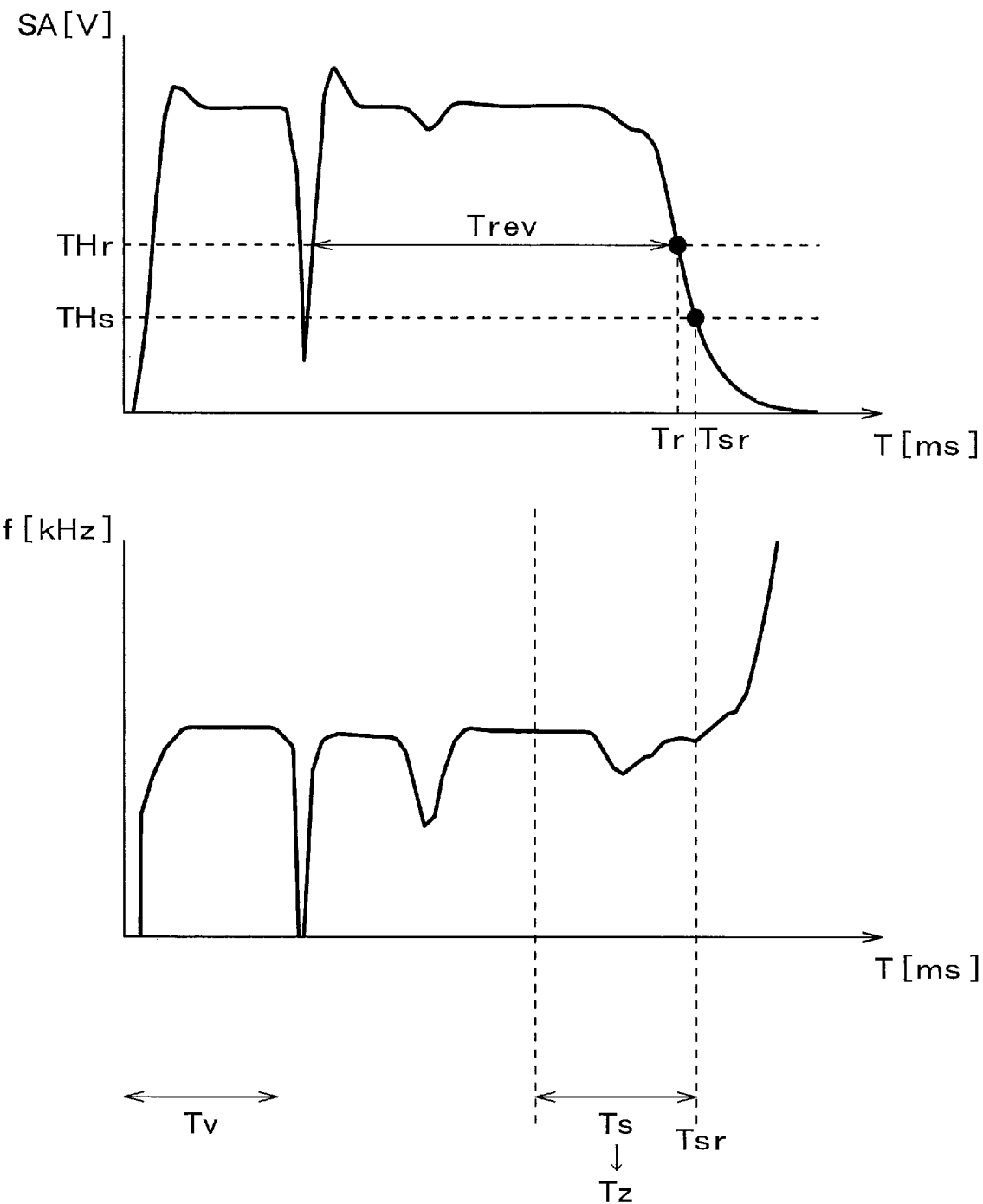
FIG. 9 is a time chart illustrating an overview of another example of the reverberation frequency measurement operation by the object detection apparatus shown in FIG. 1.

FIG. 9 shows an example of a detection method for a foot segment Ts that corresponds to the foot portion. Here, FIG. 9 shows the amplitude signal and the frequency signal of the reception signal that is acquired when the switch SW is turned on. In FIG. 9, THs denotes a foot determination threshold for detecting the foot segment Ts. In the present example, the foot determination threshold THs is set to a value that is lower than the reverberation time determination threshold THr to further increase reliability of amplitude convergence determination.

With reference to FIG. 9, the specific segment detecting unit 57 detects a predetermined time segment of which an ending time is a foot reference time Tsr as the foot segment Ts. The foot reference time Tsr is time at which the amplitude signal decreases to the foot determination threshold THs, at and subsequent to a starting time of a reverberation time Trev that is identified by a time segment that is a predetermined amount of time before the reference time Tr. Here, as a result of the reverberation time determination threshold THr being provided on a low threshold side, the reverberation time determination threshold THr and the foot determination threshold THs may be set to a same value. Here, the reverberation time is used together with frequency information for abnormality determination.

Figure 10:
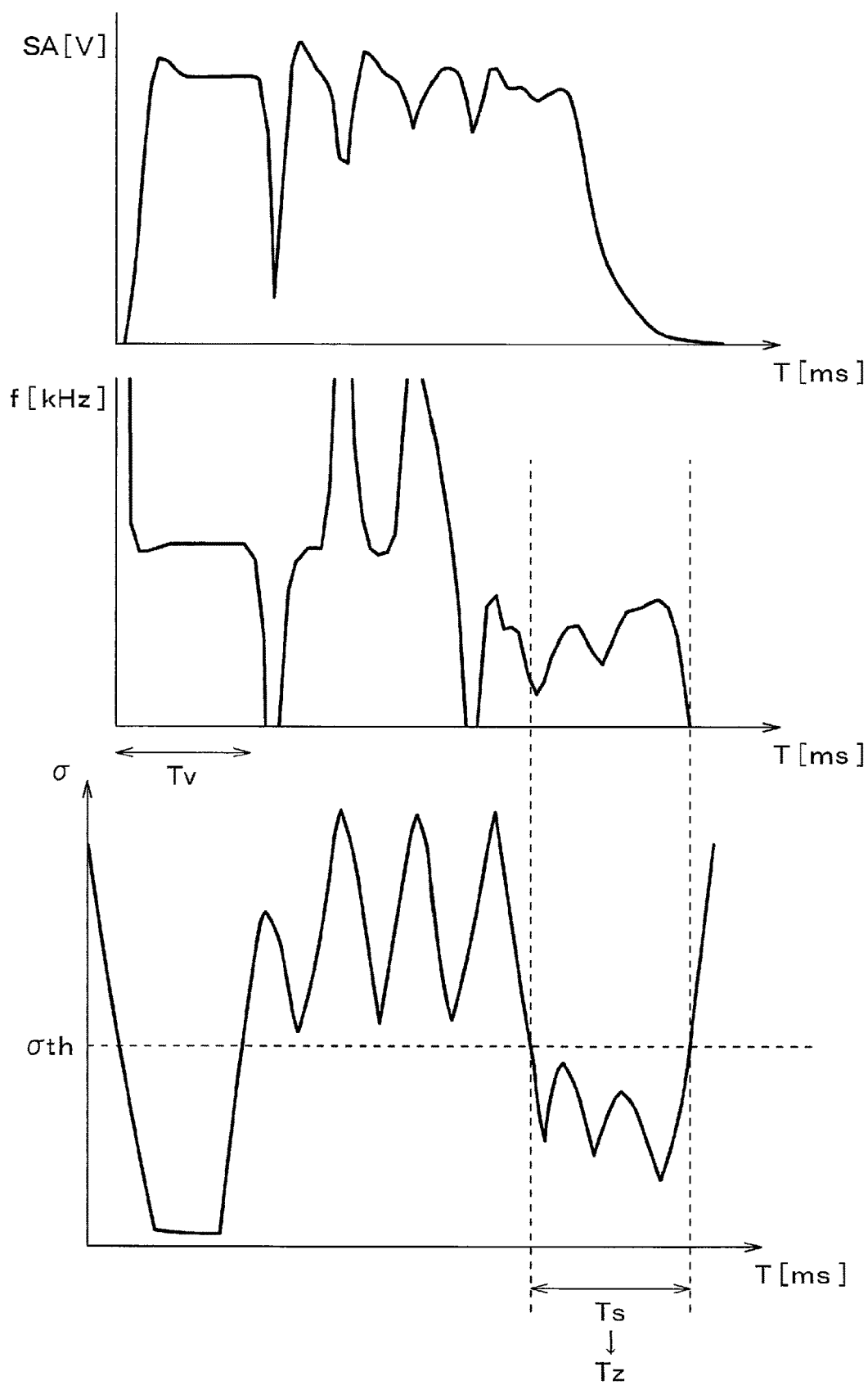
FIG. 10 is a time chart illustrating an overview of yet another example of the reverberation frequency measurement operation by the object detection apparatus shown in FIG. 1.

FIG. 10 shows another example of the detection method for the foot segment Ts. Here, FIG. 10 shows the amplitude signal and the frequency signal of the reception signal that is acquired when the switch SW is turned off. Based on a comparison of FIGS. 9 and 10, an effect of reducing beat and improving measurement accuracy regarding the reverberation frequency as a result of the switch SW being turned on can be interpreted.

In addition, in FIG. 10, σ denotes a mean squared error of the reverberation frequency. σth is a threshold for the detection of the foot segment Ts. The specific segment detecting unit 57 detects a segment that has less disturbances in the frequency waveform in which the mean squared error σ of the reverberation frequency is less than the threshold σth within the reverberation time as the foot segment Ts.

The detection method for the foot segment Ts is not limited to the examples described above. That is, for example, the foot segment Ts can be detected based on a result of matching between an amplitude signal waveform and a reference waveform for foot portion detection. As the reference waveform, a waveform that is measured at a a normal time may be used. Alternatively, as the reference waveform, a waveform that is derived by calculation from the circuit characteristics of the microphone and circuits may be used.

The measurement segment setting unit 58 may set the entirety of a single non-occurrence segment as the measurement segment or may set a portion thereof as the measurement segment. That is, for example, with reference to FIG. 5A, the measurement segment setting unit 58 may set only a predetermined portion in a latter half of the second non-occurrence segment Tn2 that is the foot portion with certainty as the measurement segment Tz.

As a result of the measurement of the reverberation frequency being performed a plurality of times and statistical processing being performed, the measurement accuracy regarding the reverberation frequency is further improved. For example, as the statistical processing, average calculation, weighted average calculation, median extraction, or a smoothing process can be used. In the statistical processing, a process for excluding a predetermined abnormal value or an outlier can also be applied.

Expressions that are conceptually similar to one another, such as acquire, detect, calculate, compute, and estimate, are interchangeable with one another as long as technical inconsistencies do not occur. In addition, an inequality sign in each of the determination processes may be that to which an equal sign is attached or that without an equal sign. That is, for example, "equal to or greater than a threshold" may be changed to "exceeds a threshold". In a similar manner, "equal to or less than a threshold" may be changed to "less than a threshold".

It goes without saying that an element that configures an above-described embodiment is not necessarily a requisite unless particularly specified as being a requisite, clearly considered a requisite in principle, or the like. In addition, in cases in which a numeric value, such as quantity, amount, or range, of a constituent element is stated, the present disclosure is not limited to the specific numeric value unless particularly specified as being a requisite, clearly limited to the specific numeric value in principle, or the like. In a similar manner, when a shape, a direction, a positional relationship, or the like of a constituent element or the like is mentioned, excluding cases in which the shape, the direction, the positional relationship, or the like is clearly described as particularly being a requisite, is clearly limited to a specific shape, direction, positional relationship, or the like in principle, or the like, the present disclosure is not limited to the shape, direction, positional relationship, or the like.

The modifications are also not limited to the examples given above. In addition, a plurality of modifications may be combined with each other. Furthermore, all or a portion of the above-described embodiments and all or a portion of the modifications may be combined with each other.

(Methods and Programs)

Steps or processes that configure the object detection method of the present disclosure correspond to the above-described embodiment, modifications, and steps or processes shown in the flowcharts in FIGS. 6 to 8. In addition, a program that corresponds to the flowcharts shown in FIGS. 6 to 8 corresponds to the object detection program according to the present embodiment.

Therefore, the present disclosure that is described according to the above-described embodiments and modifications includes the following aspects that are related to the method and program. Here, the aspects described below can be applied in combination with one other as long as technical contradictions do not occur.

According to a first aspect, an object detection method that detects an object (B) in a vicinity of a moving body (V) includes following processes. In addition, an object detection program includes the following processes that are performed by an object detection apparatus (1) that is configured to detect an object (B) in a vicinity of a moving body (V) in a state of being mounted to the moving body. Here, the following process can be reworded as procedure, step, or action.

A process for setting at least one of a transmission characteristic and a reception characteristic in a transceiver (2) that externally transmits a transmission wave that is an ultrasonic wave and receives a reception wave that includes a reflected wave of the transmission wave from an object; a process for measuring a reverberation frequency that is a frequency of a reverberation signal that is generated in the transceiver; and a process for detecting an object based on the reception wave are included, in which in the process for setting at least one of the transmission characteristic and the reception characteristic, at least one of the transmission characteristic and the reception characteristic are reduced during measurement of the reverberation frequency from that during detection of the object.

According to a second aspect, the process for setting at least one of the transmission characteristic and the reception characteristic includes a process for decreasing sound pressure during the measurement of the reverberation frequency from that during the detection of the object.

According to a third aspect, the process for setting at least one of the transmission characteristic and the reception characteristic includes a process for controlling transmission of the transmission wave in the transceiver such that, while the transmission wave is frequency-modulated during the detection of the object, the transmission wave is not frequency-modulated during the measurement of the reverberation frequency; and a code that corresponds to a frequency modulation mode of the reception wave is determine during the detection of the object.

According to a fourth aspect, the process for setting at least one of the transmission characteristic and the reception characteristic includes a process for setting the transceiver to differing circuit characteristics for the detection of the object and for the measurement of the reverberation frequency.

According to a fifth aspect, the transceiver includes a transducer (21) that provides an electromechanical conversion function and a transmission/reception circuit (22) that is electrically connected to the transducer; the transmission/reception circuit includes a capacitor (C3) and resistance (R2, R3) that configure a parallel resonant circuit (RC2) by being connected in parallel to the transducer; and the process for setting at least one of the transmission characteristic and the reception characteristic includes a process for setting differing parallel connection states of resistance for the detection of the object and for the measurement of the reverberation frequency.

According to a sixth aspect, the process for setting at least one of the transmission characteristic and the reception characteristic corrects a drive frequency of the transceiver based on a measurement result of the reverberation frequency.

According to a seventh aspect, the process for correcting the drive frequency sets a correction value of the drive frequency that is determined based on the measurement result within a prescribed range.

What is claimed is:

1. An object detection apparatus that is configured to detect an object in a vicinity of a moving body in a state of being mounted to the moving body, the object detection apparatus comprising:
   a reverberation measuring unit that measures a reverberation frequency that is a frequency of a reverberation signal that is generated in a transceiver that externally transmits a transmission wave that is an ultrasonic wave and receives a reception wave that includes a reflected wave of the transmission wave from the object;
   an object detecting unit that detects the object based on the reception wave; and
   a characteristic setting unit that sets at least one of a transmission characteristic and a reception characteristic in the transceiver, wherein
   the characteristic setting unit is at least one of a transmission control unit that sets at least one of transmission characteristics of the transmission wave and a circuit characteristic setting unit that sets circuit characteristics in the transceiver, and reduces at least one of the transmission characteristic and the reception characteristic during measurement of the reverberation frequency by the reverberation measuring unit from that during detection of the object by the object detecting unit.

2. The object detection apparatus according to claim 1, wherein:
the transmission control unit decreases sound pressure of the transmission wave during the measurement of the reverberation frequency by the reverberation measuring unit from that during the detection of the object by the object detecting unit.

3. The object detection apparatus according to claim 2, further comprising:
a code determining unit that determines a code that corresponds to a frequency modulation mode of the reception wave, wherein
the transmission control unit controls the transmission of the transmission wave in the transceiver such that, while the transmission wave is frequency modulated during the detection of the object by the object detecting unit, the transmission wave is not frequency-modulated during the measurement of the reverberation frequency by the reverberation measuring unit.

4. The object detection apparatus according to claim 3, wherein:
the circuit characteristic setting unit sets the transceiver to differing circuit characteristics for the detection of the object by the object detecting unit and for the measurement of the reverberation frequency by the reverberation measuring unit.

5. The object detection apparatus according to claim 4, wherein:
the transceiver includes a transducer that provides an electromechanical conversion function and a transmission/reception circuit that is electrically connected to the transducer;
the transmission/reception circuit has a capacitor and resistance that configure a parallel resonant circuit by being connected in parallel to the transducer; and
the circuit characteristic setting unit sets differing parallel connection states of resistance for the detection of the object by the object detecting unit and for the measurement of the reverberation frequency by the reverberation measuring unit.

6. The object detection apparatus according to claim 5, wherein:
the transmission control unit corrects the drive frequency of the transceiver based on a measurement result of the reverberation frequency from the reverberation measuring unit.

7. The object detection apparatus according to claim 6 wherein:
the transmission control unit sets a correction value of the drive frequency that is determined based on the measurement result within a prescribed range.

8. The object detection apparatus according to claim 1, wherein:
the circuit characteristic setting unit sets the transceiver to differing circuit characteristics for the detection of the object by the object detecting unit and for the measurement of the reverberation frequency by the reverberation measuring unit.

9. The object detection apparatus according to claim 1, wherein:
the transmission control unit corrects the drive frequency of the transceiver based on a measurement result of the reverberation frequency from the reverberation measuring unit.

10. An object detection method for detecting an object in a vicinity of a moving body, the object detection method comprising:
setting at least one of a transmission characteristic and a reception characteristic in a transceiver that externally transmits a transmission wave that is an ultrasonic wave and receives a reception wave that includes a reflected wave of the transmission wave from the object;
measuring a reverberation frequency that is a frequency of a reverberation signal that is generated in the transceiver;
detecting an object based on the reception wave; and
in setting at least one of the transmission characteristic and reception characteristic, reducing at least one of the transmission characteristic and the reception characteristic during measurement of the reverberation frequency from that during detection of the object.

11. The object detection method according to claim 10, wherein:
in setting at least one of the transmission characteristic and the reception characteristic, sound pressure is decreased during the measurement of the reverberation frequency from that during the detection of the object.

12. The object detection method according to claim 11, wherein:
in setting at least one of the transmission characteristic and the reception characteristic, transmission of the transmission wave in the transceiver is controlled such that, while the transmission wave is frequency-modulated during the detection of the object, the transmission wave is not frequency-modulated during the measurement of the reverberation frequency; and
a code that corresponds to a frequency modulation mode of the reception wave is determine during the detection of the object.

13. The object detection method according to claim 12, wherein:
in setting at least one of the transmission characteristic and the reception characteristic, differing circuit characteristics are set for the detection of the object and for the measurement of the reverberation frequency.

14. The object detection method according to claim 13, wherein:
the transceiver includes a transducer that provides an electromechanical conversion function and a transmission/reception circuit that is electrically connected to the transducer;
the transmission/reception circuit includes a capacitor and resistance that configure a parallel resonant circuit by being connected in parallel to the transducer; and
in setting at least one of the transmission characteristic and the reception characteristic, differing parallel connection states of resistance are set for the detection of the object and for the measurement of the reverberation frequency.

15. The object detection method according to claim 14, wherein:
in setting at least one of the transmission characteristic and the reception characteristic, a drive frequency of the transceiver is corrected based on a measurement result of the reverberation frequency.

16. The object detection method according to claim 15, wherein:
  in correcting the drive frequency, an absolute value of a correction value of the drive frequency that is determined based on the measurement result is set within a prescribed range.

17. The object detection method according to claim 10, wherein:
  in setting at least one of the transmission characteristic and the reception characteristic, differing circuit characteristics are set for the detection of the object and for the measurement of the reverberation frequency.

18. The object detection method according to claim 10, wherein:
  in setting at least one of the transmission characteristic and the reception characteristic, a drive frequency of the transceiver is corrected based on a measurement result of the reverberation frequency.

19. A non-transitory computer-readable storage medium storing therein an object detection program for causing an object detection apparatus, which detects an object in a vicinity of a moving body in a state of being mounted to the moving body, to implement processes including:
  a process for setting at least one of a transmission characteristic and a reception characteristic in a transceiver that externally transmits a transmission wave that is an ultrasonic wave and receives a reception wave that includes a reflected wave of the transmission wave from an object;
  a process for measuring a reverberation frequency that is a frequency of a reverberation signal that is generated in the transceiver; and
  a process for detecting an object based on the reception wave, wherein
  in the process for setting at least one of the transmission characteristic and the reception characteristic, at least one of the transmission characteristic and the reception characteristic are reduced during measurement of the reverberation frequency from that during detection of the object.

* * * * *